(12) United States Patent
Smith et al.

(10) Patent No.: US 9,053,242 B2
(45) Date of Patent: *Jun. 9, 2015

(54) TESTING USER INTERFACE RESPONSIVENESS FOR MOBILE APPLICATIONS

(71) Applicant: Xamarin Inc., San Francisco, CA (US)

(72) Inventors: Jason Adam Smith, Walnut Creek, CA (US); Vinicius Scopel Depizzol, San Francisco, CA (US); Nathaniel Dourif Friedman, San Francisco, CA (US); Karl Krukow, Hinnerup (DK); Jonas Maturana Larsen, Tilst (DK); David Siegel, San Francisco, CA (US)

(73) Assignee: Xamarin Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/511,117

(22) Filed: Oct. 9, 2014

(65) Prior Publication Data

US 2015/0082283 A1     Mar. 19, 2015

Related U.S. Application Data

(63) Continuation of application No. 14/029,663, filed on Sep. 17, 2013, now Pat. No. 8,881,111.

(51) Int. Cl.
*G06F 9/44* (2006.01)
*G06F 11/36* (2006.01)

(52) U.S. Cl.
CPC .............. *G06F 11/3692* (2013.01); *G06F 9/44* (2013.01); *Y02B 60/50* (2013.01)

(58) Field of Classification Search
None
See application file for complete search history.

(56) References Cited

U.S. PATENT DOCUMENTS

| | | |
|---|---|---|
| 5,280,617 A | 1/1994 | Brender et al. |
| 5,493,675 A | 2/1996 | Faiman, Jr. et al. |
| 5,790,117 A | 8/1998 | Halviatti et al. |
| 6,662,217 B1 | 12/2003 | Godfrey et al. |
| 7,415,635 B1 | 8/2008 | Annangi |
| 8,171,127 B2 | 5/2012 | Frost et al. |
| 8,171,406 B1 | 5/2012 | Newstadt et al. |
| 8,245,210 B2 | 8/2012 | Ng et al. |
| 8,448,070 B2 | 5/2013 | Dailey |

(Continued)

OTHER PUBLICATIONS

Office Communication for U.S. Appl. No. 14/029,631 mailed on Jun. 3, 2014.

(Continued)

*Primary Examiner* — Philip Wang
(74) *Attorney, Agent, or Firm* — John W. Branch; Lowe Graham Jones PLLC

(57) ABSTRACT

Embodiments are directed towards testing a responsiveness of a graphical user interface (GUI) for an application executing on a computer. During execution of each portion of a test, stimuli may be provided to the application. The stimuli may be provided to the application thread that is associated with rendering graphics for the GUI. Responses from the application to the stimuli may be monitored to determine a responsiveness of the application for at least one portion of the test. The responsiveness may be determined based on a wait time between providing a request and receiving a reply to the request, which may indicate that the application is in a state to accept input through the GUI. Responsiveness may be determined separately for each portion of the test. A displayable report may be generated to include the responsiveness of the application for each portion of the test.

26 Claims, 12 Drawing Sheets

(56) References Cited

U.S. PATENT DOCUMENTS

| | | | |
|---|---|---|---|
| 8,607,152 | B2 | 12/2013 | McMahan et al. |
| 8,856,748 | B1 | 10/2014 | Larsen et al. |
| 8,881,111 | B1* | 11/2014 | Smith et al. .................. 717/125 |
| 2003/0093780 | A1 | 5/2003 | Freudenberger et al. |
| 2003/0126590 | A1 | 7/2003 | Burrows et al. |
| 2004/0210672 | A1* | 10/2004 | Pulleyn et al. .............. 709/245 |
| 2006/0052080 | A1 | 3/2006 | Vitikainen et al. |
| 2006/0206867 | A1* | 9/2006 | Parsons et al. .............. 717/124 |
| 2008/0139195 | A1 | 6/2008 | Marsyla et al. |
| 2008/0148235 | A1 | 6/2008 | Foresti et al. |
| 2011/0041121 | A1 | 2/2011 | Schalk |
| 2011/0185231 | A1 | 7/2011 | Balestrieri et al. |
| 2011/0210907 | A1 | 9/2011 | Martin-Cocher et al. |
| 2011/0251988 | A1 | 10/2011 | Pronk et al. |
| 2011/0314343 | A1 | 12/2011 | Hoke et al. |
| 2012/0035904 | A1 | 2/2012 | Seckendorf et al. |
| 2012/0174069 | A1* | 7/2012 | Zavatone ..................... 717/124 |
| 2012/0198279 | A1 | 8/2012 | Schroeder |
| 2012/0221373 | A1* | 8/2012 | Marwah et al. ............. 705/7.27 |
| 2012/0253745 | A1 | 10/2012 | Dhanapal et al. |
| 2012/0299859 | A1 | 11/2012 | Kinoshita |
| 2013/0080502 | A1 | 3/2013 | McColl et al. |
| 2013/0081001 | A1 | 3/2013 | McColl et al. |
| 2013/0152047 | A1 | 6/2013 | Moorthi et al. |
| 2013/0179144 | A1 | 7/2013 | Lu et al. |
| 2013/0179865 | A1 | 7/2013 | Neumeyer et al. |
| 2013/0196600 | A1 | 8/2013 | Capers et al. |
| 2013/0318397 | A1 | 11/2013 | Jamison |
| 2013/0326465 | A1 | 12/2013 | Jain et al. |

OTHER PUBLICATIONS

Office Communication for U.S. Appl. No. 14/029,670 mailed on Sep. 26, 2014.
Office Communication for U.S. Appl. No. 14/029,670 mailed on Oct. 27, 2014.
Office Communication for U.S. Appl. No. 14/029,663 mailed on Jul. 3, 2014.
Office Communication for U.S. Appl. No. 14/337,064 mailed on Sep. 9, 2014.
Agesen, Ole, "GC Points in a Threaded Environment," Palo Alto, CA, Sun Microsystems, Dec. 1998, 23 pages.
White, Derek et al., "The GC Interface in the EVM1," Palo Alto, CA, Sun Microsystems, Dec. 1998, 51 pages.
Achten et al., "When Generic Functions Use Dynamic Values", 2002, Proceedings of the 14th International Conference on Implemention of Functional Languages, pp. 17-33.
Office Communication for U.S. Appl. No. 14/029,663 mailed on Dec. 24, 2013.
Office Communication for U.S. Appl. No. 14/029,631 mailed on Jan. 13, 2014.
Office Communication for U.S. Appl. No. 14/029,670 mailed on Dec. 24, 2013.
Office Communication for U.S. Appl. No. 14/029,670 mailed on Jul. 1, 2014.
Office Communication for U.S. Appl. No. 14/488,023 mailed on Dec. 8, 2014.

* cited by examiner

TESTING USER INTERFACE RESPONSIVENESS FOR MOBILE APPLICATIONS

CROSS-REFERENCE TO RELATED APPLICATIONS

The present application is a Continuation of patent application Ser. No. 14/029,663, entitled "TESTING USER INTERFACE RESPONSIVENESS FOR MOBILE APPLICATIONS" filed on Sep. 17, 2013, the benefit of the earlier filing date of which is hereby claimed under 35 U.S.C. §120 and 37 C.F.R. §1.78, and which is further incorporated by reference in its entirety.

TECHNICAL FIELD

The present invention relates generally to computer application development, and more particularly, but not exclusively, to testing a responsiveness of a graphical user interface for computer applications.

BACKGROUND

A highly competitive mobile application marketplace and the consumerization of information technology have put tremendous pressure on mobile application developers to deliver high quality mobile user experiences for consumers. In this competitive environment, a small defect or failure of an application may lead to abandonment or poor consumer reviews for the application. Moreover, device fragmentation—created by hundreds of devices on the market using a variety of different mobile operating systems—multiples the amount of effort needed to provide adequate quality assurance. This additional quality assurance effort typically results in a time-consuming and costly development process. The difficulties associated with providing sufficient quality assurance may be further aggravated by faster release cycles for mobile applications, which may necessitate more stringent and efficient regression testing.

Furthermore, since user-interfaces for mobile applications may also change often, traditional user-interface testing tools—which may require significant investment to configure and set up—may rely on fragile methods for defining correct user-interface behavior.

Accordingly, failure to keep these user-interface testing tools in sync with the faster-release cycles for mobile applications may often lead to broken or ineffective test cases. In addition, many traditional user-interface test tools do not provide cross-platform support and may be difficult to integrate into mobile application developer tools and workflows. Thus, it is with respect to these and other considerations that the invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
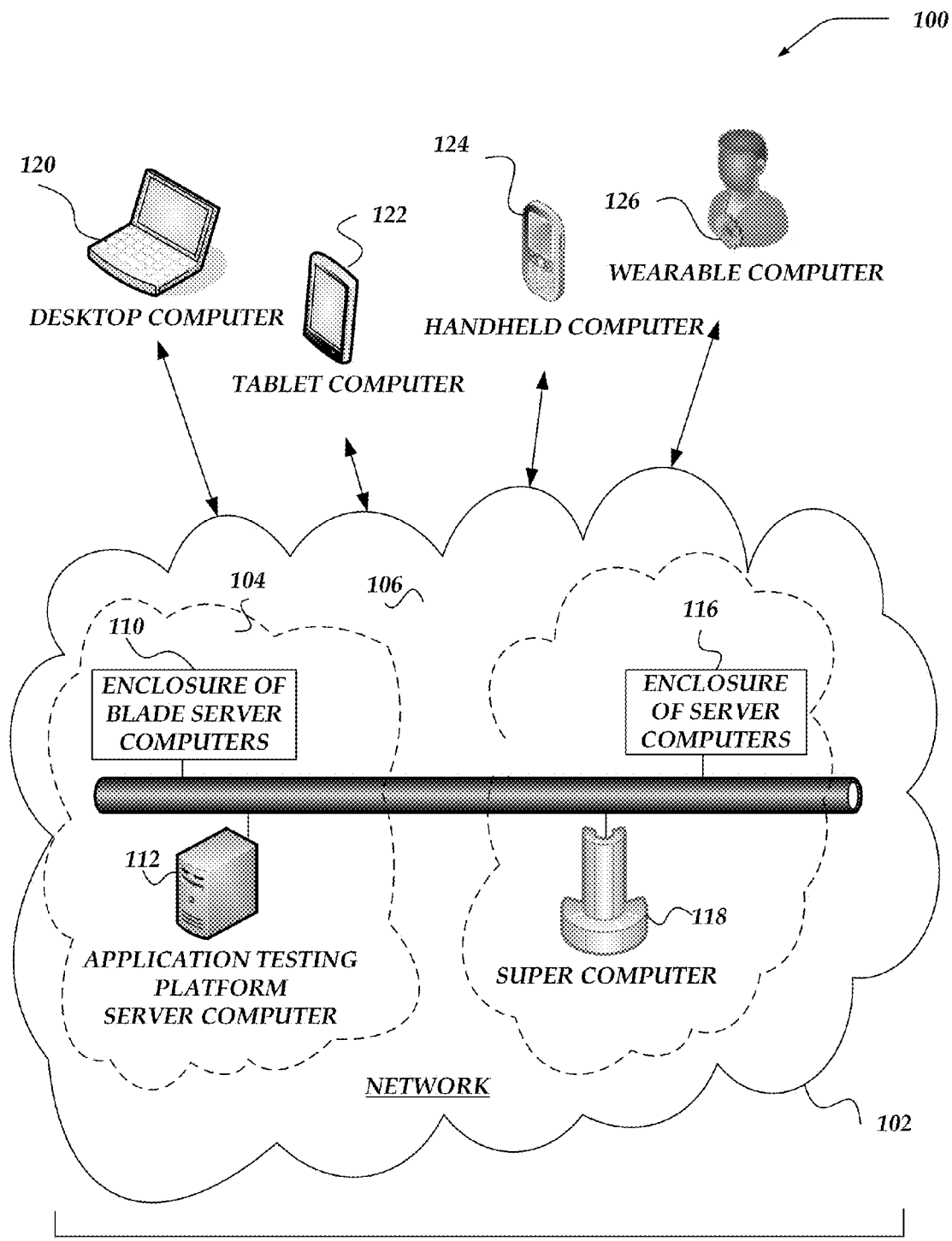
FIG. 1 illustrates a system environment in which various embodiments may be implemented.

Various embodiments are described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may be entirely hardware embodiments, entirely software embodiments, or embodiments combining software and hardware aspects. The following detailed description should, therefore, not be limiting.

Throughout the specification and claims, the following terms take the meanings explicitly associated herein, unless the context clearly dictates otherwise. The term "herein" refers to the specification, claims, and drawings associated with the current application. The phrase "in one embodiment" as used herein does not necessarily refer to the same embodiment, though it may.

Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "application" refers to a computing/software application/program designed to operate on a computing device. Applications may include, but are not limited to, mobile applications, web applications, web pages, "desktop" applications, or the like. So, for example, a mobile application may be an application designed to operate on a mobile device. As used herein, the term "test application" refers to an application being tested (e.g., being subjected to a test).

As used herein, the term "application developer" or "developer" refers to users that design and/or develop applications. In some embodiments, application developers may create and deploy applications (e.g., mobile applications) to an application testing platform for testing of the application on one or more devices (e.g., a plurality of mobile devices). In at least one of various embodiments, these devices may be referred to as target devices or target computers.

As used herein, the term "test" refers to information and/or instructions for testing the functionality of an application. A test may include one or more test steps. A "test step" refers to a portion of a test that is arranged to perform one or more actions on a device being tested (e.g., a target computer). A test may be a test script or other application testing tool. As used herein, the term "test script" refers to a script (e.g., a program) that may be written in at least one of various computing software languages, such as Ruby, C#, Objective-C, Java, JavaScript, C, C++, or the like. Generally, test scripts may be written in any known and/or custom computer software language. In at least one of various embodiments, test scripts may be arranged to include one or more test steps within a test script. In some embodiments, test scripts may include additional information used for configuring tests, such as, but not limited to, scheduling information (e.g., when to run the test, how often to run the test, or the like), reporting configuration (e.g., notification rules, report formatting, or the like), device criteria, or the like.

As used herein, the term "stimuli" or "stimulus" refers to an action performed on an application to evoke a response from the application. A stimulus may include one or more requests for the application to respond to the request. Examples of stimuli may include, but are not limited to, a status check, a heartbeat, a state request, a request to determine if the application can accept external inputs, or the like, or any combination thereof. In some embodiments, the stimuli may be provided to the application by a client testing application (or test agent). In at least one of various embodiments, the application may respond to the stimuli by providing a reply to the client testing application. The reply may include a variety of information, such as, but not limited to, a status or state of the application, and acknowledgment of the stimuli, or other metrics associated with the application and/or target computer (which may be monitored or obtained during execution of a test). Such other metrics may include, but are not limited to, memory usage, processor utilization, power consumption, network traffic/latency, or the like.

As used herein, the term "responsiveness" refers to a metric that can be used to determine how long an application takes to return to an idle state or a state where the application can accept inputs through a graphical user interface. In some embodiments, the responsiveness may be determined based on a wait time and/or response time determined from when stimulus is provided to the application and when a reply is received in response to the stimulus.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards testing a responsiveness of a graphical user interface (GUI) for an application. In some embodiments, a test script may be executed on a computer, which may enable testing of the functionality of an application that is also executing on the computer. During execution of each portion of the test script, at least one stimulus may be provided to the application. Each stimulus may request a response from the mobile application. In some embodiments, the at least one stimulus may be provided to a process thread of the application that performs graphics rendering for a GUI. In other embodiments, the at least one stimulus may include a heartbeat that executes with a main logical loop of the mobile application.

Replies from the application in response to the stimulus may be monitored. These replies may include different information, including, but not limited to, an acknowledgement of the stimulus, a current state of the application, memory consumption, processor utilization, power consumption, network latency, or the like.

In some embodiments, a responsiveness of the application may be determined for each portion (e.g., one or more test steps) of the executed test based on the monitored information. In some embodiments, the responsiveness may be determined based on a wait time between providing a given request to the application and receiving a reply from the application in response to the given request. In other embodiments, the responsiveness may be determined based on a response time between a first request of a plurality of requests and a reply from the application indicating that the application is in a state to accept input through the GUI.

In various embodiments, a report may be displayed to a user. The report may include at least a representation (e.g., graphical representation) the responsiveness of the application for at least one portion (or, in some embodiments, each portion) of the at least one test script. In at least one of various embodiments, the report may further include a comparison of the responsiveness of the application for each of a plurality of different computers. In at least one such embodiment, the responsiveness may be determined for an application that is separately executing on each of a plurality of different computers. In yet other embodiments, the report may include a representative comparison of the responsiveness of the application and other metrics (e.g., memory consumption, processor utilization, power consumption, network latency, or the like).

Illustrative Operating Environment

FIG. 1 shows components of an environment in which various embodiments may be practiced. Not all of the components may be required to practice the various embodiments, and variations in the arrangement and type of the components may be made without departing from the spirit or scope of the various embodiments.

In at least one embodiment, cloud network 102 enables one or more network services for a user based on the operation of corresponding arrangements 104 and 106 of virtually any type of networked computer. As shown, the networked computers may include application testing platform server computer 112, enclosure of blade server computers 110, enclosure of server computers 116, super computer 118, and the like. Although not shown, one or more mobile computers may be included in cloud network 102 in one or more arrangements to provide one or more network services to a user. Also, these arrangements of networked computers may or may not be mutually exclusive of each other.

One embodiment of application testing platform server computer 112 is described in more detail below in conjunction with FIG. 4. Briefly, however, application testing platform server computer 112 may include a network computer capable of deploying a test application and/or a test to target computer, such as networked computers 122, 124, 126, and/or 120. In at least one embodiment, application testing platform server computer 112 may generate a displayable report that includes the responsiveness of an application for one or more portions of a test for a plurality of different target computers. In at least one of the various embodiments, application testing platform server computer 112 may include processes, modules, services, components, or the like, for receiving mobile applications for testing, managing testing of mobile applications, generating reports based testing results, as well as requests and other communications to and from client computers (e.g., target computers) that may be running various client applications.

Also, in at least one of the various embodiments, enclosure of blade server computers 110, enclosure of enclosure of server computers 116, super computer 118 may include computers that perform the actions of application testing platform server computer 112.

Additionally, the user may employ a plurality of virtually any type of wired or wireless networked computers (e.g., client computers) to communicate with cloud network 102 and access at least one of the network services enabled by one or more of arrangements 104 and 106. These networked computers may include tablet computer 122, handheld computer 124, wearable computer 126, desktop computer 120, and the like. Although not shown, in various embodiments, the user may also employ notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), televisions, integrated devices combining at least one of the preceding computers, and the like.

One embodiment of a client computer is described in more detail below in conjunction with FIG. 3. Generally, client computers may include virtually any networked computer capable of communicating over a wired, wireless, or some combination of wired and wireless network.

In various embodiments, network 102 may employ virtually any form of communication technology and topology. For example, network 102 can include local area networks Personal Area Networks (PANs), (LANs), Campus Area Networks (CANs), Metropolitan Area Networks (MANs) Wide Area Networks (WANs), direct communication connections, and the like, or any combination thereof. On an interconnected set of LANs, including those based on differing architectures and protocols, a router acts as a link between LANs, enabling messages to be sent from one to another. In addition, communication links within networks may include virtually any type of link, e.g., twisted wire pair lines, optical fibers, open air lasers or coaxial cable, plain old telephone service (POTS), wave guides, acoustic, full or fractional dedicated digital communication lines including T1, T2, T3, and T4, and/or other carrier and other wired media and wireless media. These carrier mechanisms may include E-carriers, Integrated Services Digital Networks (ISDNs), universal serial bus (USB) ports, Firewire ports, Thunderbolt ports, Digital Subscriber Lines (DSLs), wireless links including satellite links, or other communications links known to those skilled in the art. Moreover, these communication links may further employ any of a variety of digital signaling technologies, including without limit, for example, DS-0, DS-1, DS-2, DS-3, DS-4, OC-3, OC-12, OC-48, or the like. Furthermore, remotely located computers could be remotely connected to networks via a modem and a temporary communication link. In essence, network 102 may include virtually any communication technology by which information may travel between computers. Additionally, in the various embodiments, the communicated information may include virtually any kind of information including, but not limited to processor-readable instructions, data structures, program modules, applications, raw data, control data, archived data, video data, voice data, image data, text data, and the like.

Network 102 may be partially or entirely embodied by one or more wired and/or wireless networks. A wireless network may include any of a variety of wireless sub-networks that may further overlay stand-alone ad-hoc networks, and the like. Such sub-networks may include mesh networks, Wireless LAN (WLAN) networks, Wireless Router (WR) mesh, cellular networks, pico networks, PANs, Open Air Laser networks, Microwave networks, and the like. Network 102 may further include an autonomous system of intermediate network computers such as terminals, gateways, routers, switches, firewalls, load balancers, and the like, which are coupled to wired and/or wireless communication links. These autonomous computers may be operable to move freely and randomly and organize themselves arbitrarily, such that the topology of network 102 may change rapidly.

Network 102 may further employ a plurality of wired and wireless access technologies, e.g., 2nd (2G), 3rd (3G), 4th (4G), $5^{th}$ (5G) generation wireless access technologies, and the like, for mobile computers. These wired and wireless access technologies may also include Global System for Mobile communication (GSM), General Packet Radio Services (GPRS), Enhanced Data GSM Environment (EDGE), Code Division Multiple Access (CDMA), Wideband Code Division Multiple Access (WCDMA), Long Term Evolution Advanced (LTE), Universal Mobile Telecommunications System (UMTS), Orthogonal frequency-division multiplexing (OFDM), Wideband Code Division Multiple Access (W-CDMA), Code Division Multiple Access 2000 (CDMA2000), Evolution-Data Optimized (EV-DO), High-Speed Downlink Packet Access (HSDPA), IEEE 802.16 Worldwide Interoperability for Microwave Access (WiMax), ultra wide band (UWB), user datagram protocol (UDP), transmission control protocol/Internet protocol (TCP/IP), any portion of the Open Systems Interconnection (OSI) model protocols, Short Message Service (SMS), Multimedia Messaging Service (MMS), Web Access Protocol (WAP), Session Initiation Protocol/Real-time Transport Protocol (SIP/RTP), or any of a variety of other wireless or wired communication protocols. In one non-limiting example, network 102 may enable a mobile computer to wirelessly access a network service through a combination of several radio network access technologies such as GSM, EDGE, SMS, HSDPA, LTE and the like.

Enclosure of Blade Server Computers

Figure 2A:
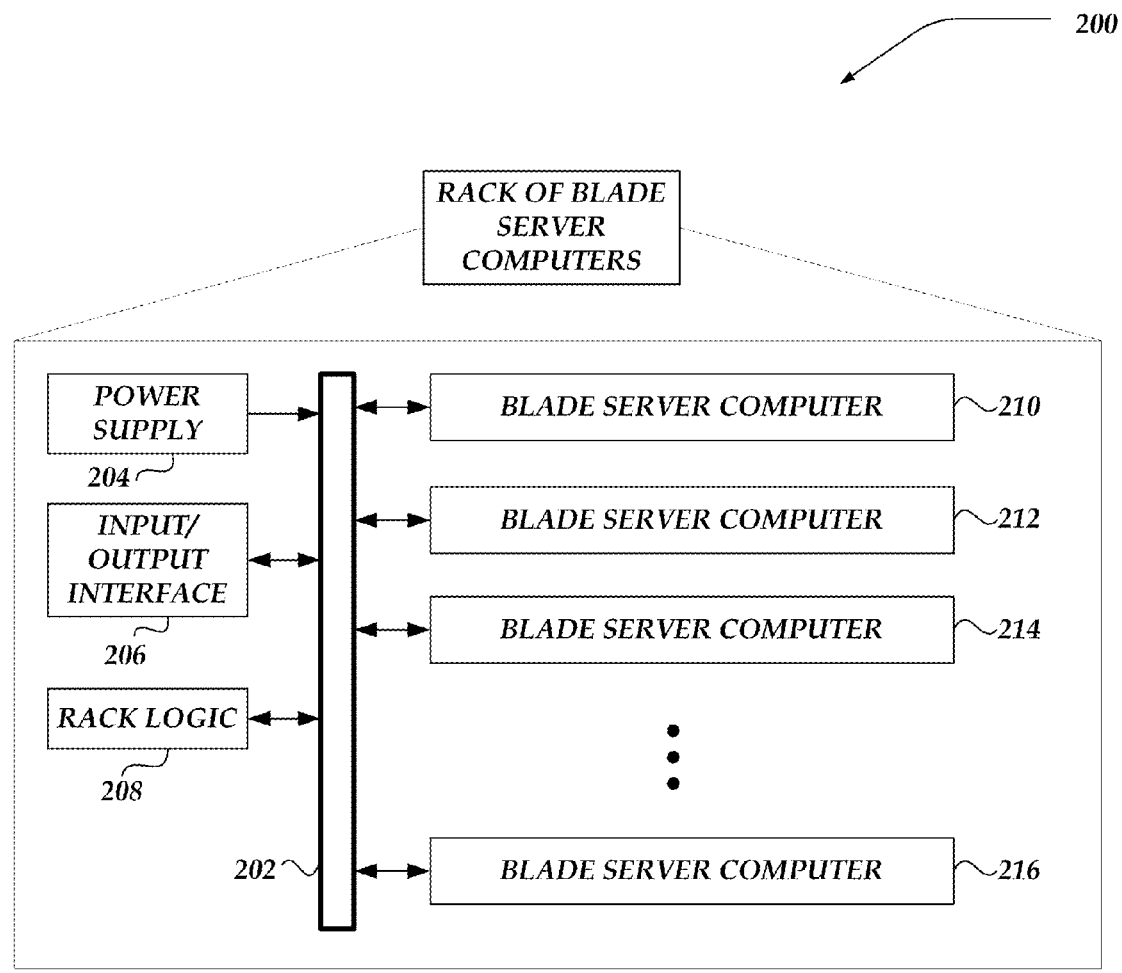
FIG. 2A shows a schematic drawing of a rack of blade server computers.

FIG. 2A shows one embodiment of an enclosure of blade server computers 200, such as enclosure of blade server computers 110 of FIG. 1. Enclosure of blade server computers 200 may include many more or fewer components than those shown in FIG. 2A. However, the components shown are sufficient to disclose an illustrative embodiment. Generally, a blade server computer is a stripped down computer with a modular design optimized to minimize the use of physical space and energy. A blade enclosure can include several blade server computers and provide each with power, cooling, network interfaces, input/output interfaces, and resource management. Although not shown, an enclosure of server computers typically includes several computers that may have at least one network connection and a power cord connection. Each server computer often includes redundant components for power and interfaces.

As shown in the figure, enclosure 200 contains power supply 204, and input/output interface 206, rack logic 208, several blade server computers 210, 212, 214, and 216, and backplane 202. Power supply 204 provides power to each component and blade server computer within the enclosure. The input/output interface 206 provides internal and external communication for components and blade server computers within the enclosure. Backplane 208 can enable passive and/or active communication of power, logic, input signals, and output signals for each blade server computer.

Illustrative Blade Server Computer

Figure 2B:
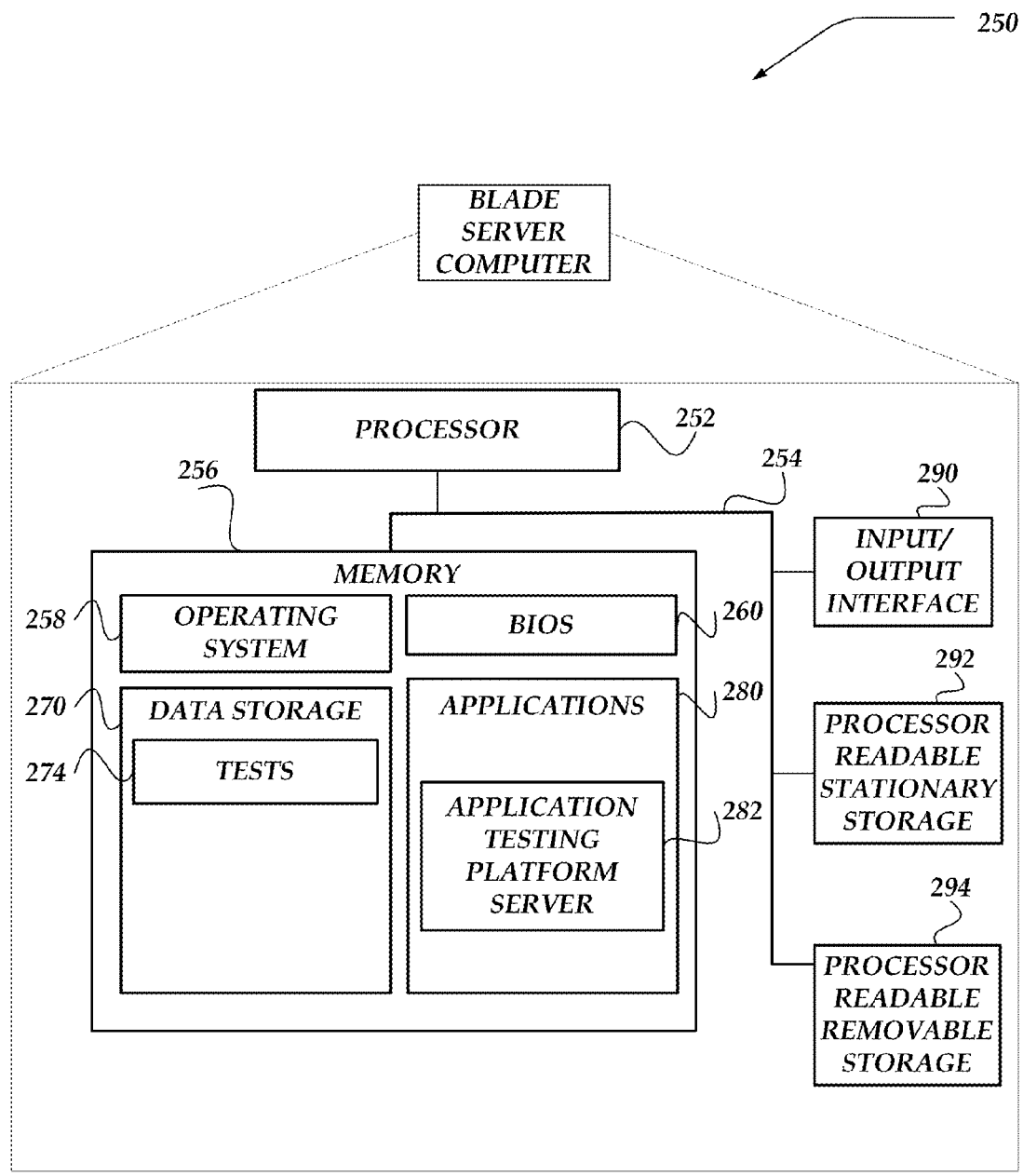
FIG. 2B illustrates a schematic embodiment of a blade server computer that may be included in a rack of blade server computers such as that shown in FIG. 2A.

FIG. 2B illustrates an illustrative embodiment of blade server computer 250, which may include many more or fewer components than those shown. As shown in FIG. 2A, a plurality of blade server computers may be included in one enclosure that shares resources provided by the enclosure to reduce size, power, and cost.

Blade server computer 250 includes processor 252 which communicates with memory 256 via bus 254. Blade server computer 250 also includes input/output interface 290, processor-readable stationary storage device 292, and processor-readable removable storage device 294. Input/output interface 290 can enable blade server computer 250 to communicate with other blade server computers, mobile computers, network computers, and the like. Interface 290 may provide wireless and/or wired communication links for blade server computer. Processor-readable stationary storage device 292 may include one or more devices such as an electromagnetic storage device (hard disk), solid state hard disk (SSD), hybrid of both an SSD and a hard disk, and the like. In some configurations, a blade server computer may include multiple storage devices. Also, processor-readable removable storage device 294 enables processor 252 to read non-transitory storage media for storing and accessing processor-readable instructions, code, modules, data structures, and other forms of data. The non-transitory storage media may include Flash drives, tape media, floppy media, and the like.

Memory 256 may include Random Access Memory (RAM), Read-Only Memory (ROM), hybrid of RAM and ROM, and the like. As shown, memory 256 includes operating system 258 and basic input/output system (BIOS) 260 for enabling the operation of blade server computer 250. In various embodiments, a general-purpose operating system may be employed such as a version of UNIX, LINUX™, a specialized server operating system such as Microsoft's Windows Server™, or the like.

Memory 256 further includes one or more data storage 270, which can be utilized by blade server computer 250 to store, among other things, applications 280 and/or other data. Data store 270 may include program code, instructions, data, algorithms, and the like, for use by processor 252 to execute and perform actions such as those described in conjunction with FIGS. 5-7. In one embodiment, at least some of datastore 270 might also be stored on another component of blade server computer 250, including, but not limited to, processor-readable removable storage device 294, processor-readable stationary storage device 292, or any other non-transitory processor-readable storage device (not shown). Data storage 270 may include, for example, tests 274, or the like. Tests 274 may contain scripts and/or programs that may be employed to test applications (e.g., mobile applications), as well as, other supporting data, arranged in lists, databases, configuration files, or the like.

Applications 280 may include processor executable instructions which, when executed by blade server computer 250, transmit, receive, and/or otherwise process messages, audio, video, and enable communication with other networked computers. Examples of application programs include database servers, file servers, calendars, transcoders, and so forth. Applications 280 may include, for example, application testing platform server 282, which may be enabled to perform actions further described below in conjunction with FIGS. 5-7.

Human interface components (not pictured), may be remotely associated with blade server computer 250, which can enable remote input to and/or output from blade server computer 250. For example, information to a display or from a keyboard can be routed through the input/output interface 290 to appropriate peripheral human interface components that are remotely located. Examples of peripheral human interface components include, but are not limited to, an audio interface, a display, keypad, pointing device, touch interface, and the like.

Furthermore, in at least one of the various embodiments, application testing platform server 282 may be operative in a cloud-based computing environment. In at least one of the various embodiments, this application, and others, that comprise the mobile application testing platform may be executing within virtual machines and/or virtual servers that may be managed in a cloud-based based computing environment. In at least one of the various embodiments, in this context the applications may flow from one physical blade server computer and/or network computer within the cloud-based environment to another depending on performance and scaling considerations automatically managed by the cloud computing environment. Likewise, in at least one of the various embodiments, virtual machines and/or virtual servers dedicated to running application testing platform server 282 may be provisioned and de-commissioned automatically.

Also, in at least one of the various embodiments, tests 274, or the like, may be located on virtual servers running in a cloud-based computing environment rather than being tied to one or more specific physical blade server computers.

Illustrative Mobile Computer

Figure 3:
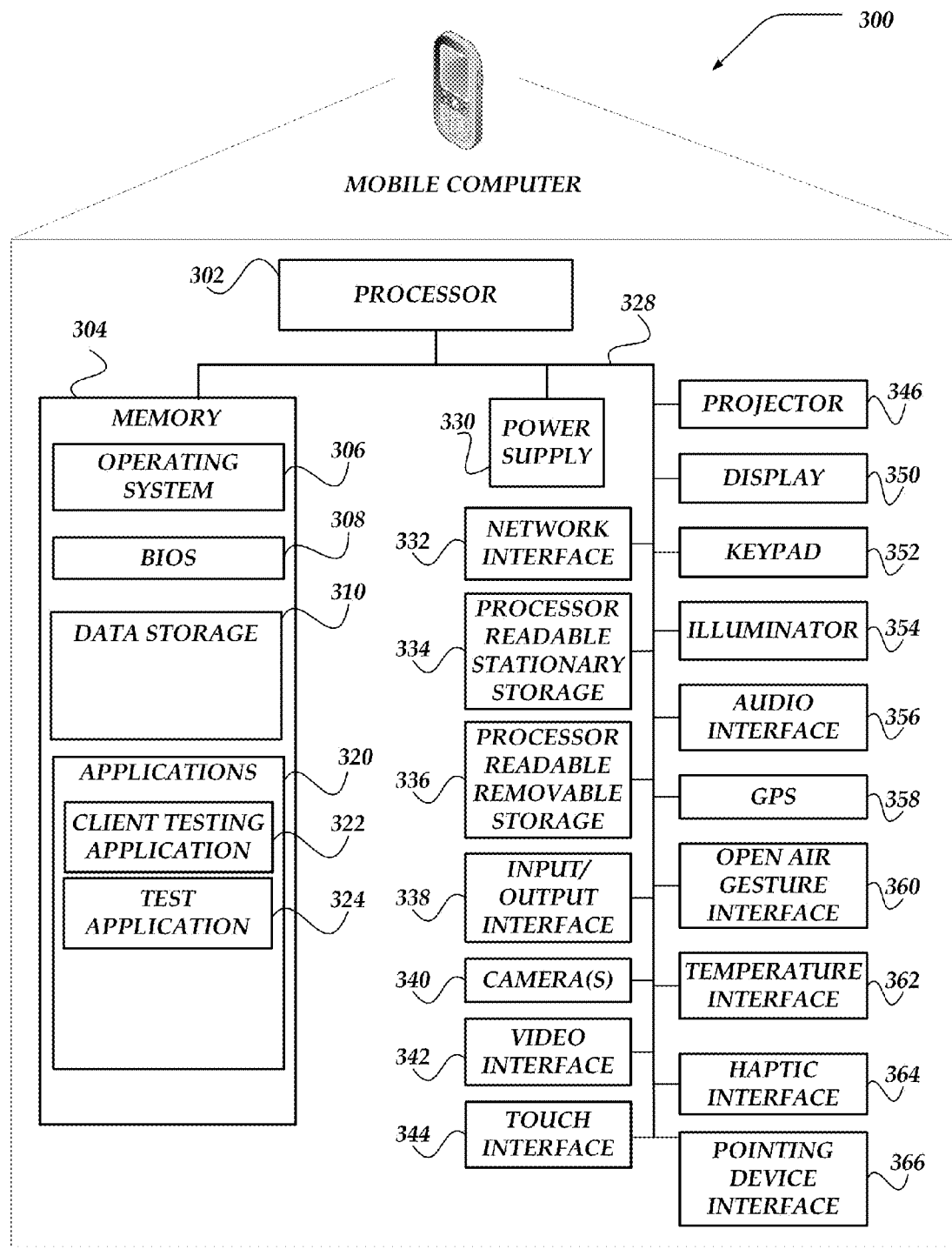
FIG. 3 shows a schematic embodiment of a mobile computer.

FIG. 3 shows one embodiment of mobile computer 300 that may include many more or less components than those shown. Mobile computer 300 may represent, for example, at least one embodiment of mobile computers shown in FIG. 1.

Mobile computer 300 may include processor 302 in communication with memory 304 via bus 328. Mobile computer 300 may also include power supply 330, network interface 332, audio interface 356, display 350, keypad 352, illuminator 354, video interface 342, input/output interface 338, haptic interface 364, global positioning systems (GPS) receiver 358, open air gesture interface 360, temperature interface 362, camera(s) 340, projector 346, pointing device interface 366, processor-readable stationary storage device 334, and processor-readable removable storage device 336. Mobile computer 300 may optionally communicate with a base station (not shown), or directly with another computer. And in one embodiment, although not shown, a gyroscope may be employed within mobile computer 300 to measuring and/or maintaining an orientation of mobile computer 300.

Power supply 330 may provide power to mobile computer 300. A rechargeable or non-rechargeable battery may be used to provide power. The power may also be provided by an external power source, such as an AC adapter or a powered docking cradle that supplements and/or recharges the battery.

Network interface 332 includes circuitry for coupling mobile computer 300 to one or more networks, and is constructed for use with one or more communication protocols and technologies including, but not limited to, protocols and technologies that implement any portion of the OSI model, GSM, CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 332 is sometimes known as a transceiver, transceiving device, or network interface card (NIC).

Audio interface 356 may be arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of mobile computer 300, e.g., using voice recognition, detecting touch based on sound, and the like.

Display 350 may be a liquid crystal display (LCD), gas plasma, electronic ink, light emitting diode (LED), Organic LED (OLED) or any other type of light reflective or light transmissive display that can be used with a computer. Display 350 may also include a touch interface 344 arranged to receive input from an object such as a stylus or a digit from a human hand, and may use resistive, capacitive, surface acoustic wave (SAW), infrared, radar, or other technologies to sense touch and/or gestures.

Projector 346 may be a remote handheld projector or an integrated projector that is capable of projecting an image on a remote wall or any other reflective object such as a remote screen.

Video interface 342 may be arranged to capture video images, such as a still photo, a video segment, an infrared video, or the like. For example, video interface 342 may be coupled to a digital video camera, a web-camera, or the like. Video interface 342 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 352 may comprise any input device arranged to receive input from a user. For example, keypad 352 may include a push button numeric dial, or a keyboard. Keypad 352 may also include command buttons that are associated with selecting and sending images.

Illuminator 354 may provide a status indication and/or provide light. Illuminator 354 may remain active for specific periods of time or in response to events. For example, when illuminator 354 is active, it may backlight the buttons on keypad 352 and stay on while the mobile computer is powered. Also, illuminator 354 may backlight these buttons in various patterns when particular actions are performed, such as dialing another mobile computer. Illuminator 354 may also cause light sources positioned within a transparent or translucent case of the mobile computer to illuminate in response to actions.

Mobile computer 300 may also comprise input/output interface 338 for communicating with external peripheral devices or other computers such as other mobile computers and network computers. The peripheral devices may include an audio headset, display screen glasses, remote speaker system, remote speaker and microphone system, and the like. Input/output interface 338 can utilize one or more technologies, such as Universal Serial Bus (USB), Infrared, WiFi, WiMax, Bluetooth™, and the like.

Haptic interface 364 may be arranged to provide tactile feedback to a user of the mobile computer. For example, the haptic interface 364 may be employed to vibrate mobile computer 300 in a particular way when another user of a computer is calling. Temperature interface 362 may be used to provide a temperature measurement input and/or a temperature changing output to a user of mobile computer 300. Open air gesture interface 360 may sense physical gestures of a user of mobile computer 300, for example, by using single or stereo video cameras, radar, a gyroscopic sensor inside a computer held or worn by the user, or the like. Camera 340 may be used to track physical eye movements of a user of mobile computer 300.

GPS transceiver 358 can determine the physical coordinates of mobile computer 300 on the surface of the Earth, which typically outputs a location as latitude and longitude values. GPS transceiver 358 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of mobile computer 300 on the surface of the Earth. It is understood that under different conditions, GPS transceiver 358 can determine a physical location for mobile computer 300. In at least one embodiment, however, mobile computer 300 may, through other components, provide other information that may be employed to determine a physical location of the mobile computer, including for example, a Media Access Control (MAC) address, IP address, and the like.

Human interface components can be peripheral devices that are physically separate from mobile computer 300, allowing for remote input and/or output to mobile computer 300. For example, information routed as described here through human interface components such as display 350 or keyboard 352 can instead be routed through network interface 332 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a mobile computer with such peripheral human interface components is a wearable computer, which might include a remote pico projector along with one or more cameras that remotely communicate with a separately located mobile computer to sense a user's gestures toward portions of an image projected by the pico projector onto a reflected surface such as a wall or the user's hand.

A mobile computer may include a browser application that is configured to receive and to send web pages, web-based messages, graphics, text, multimedia, and the like. The mobile computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 304 may include RAM, ROM, and/or other types of memory. Memory 304 illustrates an example of computer-readable storage media (devices) for storage of information such as computer-readable instructions, data structures, program modules or other data. Memory 304 may store BIOS 308 for controlling low-level operation of mobile computer 300. The memory may also store operating system 306 for controlling the operation of mobile computer 300. It will be appreciated that this component may include a general-purpose operating system such as a version of UNIX, or LINUX™, or a specialized mobile computer communication operating system such as Windows Phone™, or the Symbian® operating system. The operating system may include, or interface with a Java virtual machine module that enables control of hardware components and/or operating system operations via Java application programs.

Memory 304 may further include one or more data storage 310, which can be utilized by mobile computer 300 to store, among other things, applications 320 and/or other data. For example, data storage 310 may also be employed to store information that describes various capabilities of mobile computer 300. The information may then be provided to another device or computer based on any of a variety of events, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions. In one embodiment, at least some of data storage 310 might also be stored on another component of mobile computer 300, including, but not limited to, non-transitory processor-readable removable storage device 336, processor-readable stationary storage device 334, or even external to the mobile computer.

Applications 320 may include computer executable instructions which, when executed by mobile computer 300, transmit, receive, and/or otherwise process instructions and data. Applications 320 may include, for example, client testing application 322, and test application 324.

Client testing application 322 may be configured to employ a test on test application 324 and determine a responsiveness of test application 324 during the test. In at least one of the various embodiments, client testing application 322 may be used to exchange communications to and from application testing platform server computer 112 of FIG. 1, including, but not limited to, queries, searches, API calls, or the like. Client testing application 322 may be employed to remotely control test application 324 based on test scripts that may be provided by application testing platform server computer 112 of FIG. 1. In any event, client testing application 322 may be configured to employ various embodiments, combinations of embodiments, processes, or parts of processes, as described herein. In at least one of various embodiments, client testing application 322 may be referred to as a test agent.

Test application 324 may be configured to perform actions based on instructions provided by client testing application 322 for a test. Test application 324 may also be configured to receive stimuli from client testing application 322 and respond to the stimuli (e.g., when test application 324 is in a state to accept external inputs through a GUI). In any event, test application 324 may be configured to employ various embodiments, combinations of embodiments, processes, or parts of processes, as described herein.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Illustrative Network Computer

Figure 4:
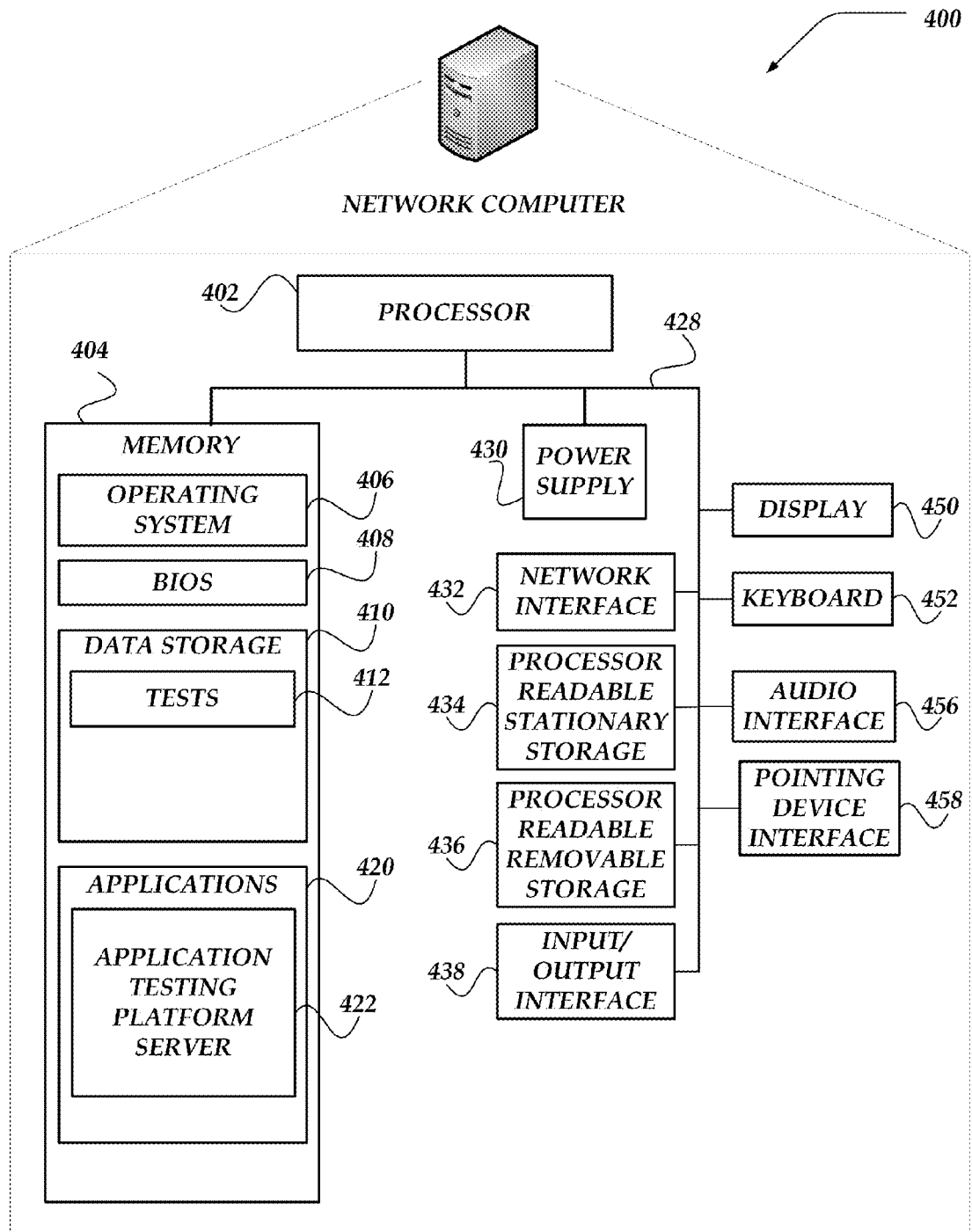
FIG. 4 illustrates a schematic embodiment of a network computer.

FIG. 4 shows one embodiment of network computer 400 that may be included in a system implementing the invention. Network computer 400 may include many more or less components than those shown in FIG. 4. However, the components shown are sufficient to disclose an illustrative embodiment for practicing these innovations. Network computer 400 may represent, for example, one embodiment of at least one of application testing platform server computer 112 of FIG. 1.

As shown in the figure, network computer 400 includes a processor 402 in communication with a memory 404 via a bus 428. Network computer 400 also includes a power supply 430, network interface 432, audio interface 456, display 450, keyboard 452, input/output interface 438, processor-readable stationary storage device 434, and processor-readable removable storage device 436. Power supply 430 provides power to network computer 400.

Network interface 432 includes circuitry for coupling network computer 400 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 432 is sometimes known as a transceiver, transceiving device, or network interface card (NIC). Network computer 400 may optionally communicate with a base station (not shown), or directly with another computer.

Audio interface 456 is arranged to produce and receive audio signals such as the sound of a human voice. For example, audio interface 456 may be coupled to a speaker and microphone (not shown) to enable telecommunication with others and/or generate an audio acknowledgement for some action. A microphone in audio interface 456 can also be used for input to or control of network computer 400, for example, using voice recognition.

Display 450 may be a liquid crystal display (LCD), gas plasma, electronic ink, light emitting diode (LED), Organic LED (OLED) or any other type of light reflective or light transmissive display that can be used with a computer. Display 450 may be a handheld projector or pico projector capable of projecting an image on a wall or other object.

Network computer 400 may also comprise input/output interface 438 for communicating with external devices or computers not shown in FIG. 4. Input/output interface 438 can utilize one or more wired or wireless communication technologies, such as USB™, Firewire™, WiFi, WiMax, Thunderbolt™, Infrared, Bluetooth™, Zigbee™, serial port, parallel port, and the like.

Human interface components can be physically separate from network computer 400, allowing for remote input and/or output to network computer 400. For example, information routed as described here through human interface components such as display 450 or keyboard 452 can instead be routed through the network interface 432 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 458 to receive user input.

Memory 404 may include Random Access Memory (RAM), Read-Only Memory (ROM), and/or other types of memory. Memory 404 illustrates an example of computer-readable storage media (devices) for storage of information such as computer-readable instructions, data structures, program modules or other data. Memory 404 stores a basic input/output system (BIOS) 408 for controlling low-level operation of network computer 400. The memory also stores an operating system 406 for controlling the operation of network computer 400. It will be appreciated that this component may include a general-purpose operating system such as a version of UNIX, or LINUX™, or a specialized operating system such as Microsoft Corporation's Windows® operating system, or the Apple Corporation's iOS® operating system. The operating system may include, or interface with a Java virtual machine module that enables control of hardware components and/or operating system operations via Java application programs.

Memory 404 may further include one or more data storage 410, which can be utilized by network computer 400 to store, among other things, applications 420 and/or other data. For example, data storage 410 may also be employed to store information that describes various capabilities of network computer 400. The information may then be provided to another device or computer based on any of a variety of events, including being sent as part of a header during a communication, sent upon request, or the like. Data storage 410 may also be employed to store social networking information including address books, buddy lists, aliases, user profile information, or the like. Data storage 410 may further include program code, data, algorithms, and the like, for use by a processor, such as processor 402 to execute and perform actions such as those actions described in conjunction with FIGS. 5-7. In one embodiment, at least some of data storage 410 might also be stored on another component of network computer 400, including, but not limited to, non-transitory media inside processor-readable removable storage device 436, processor-readable stationary storage device 434, or any other computer-readable storage device within network computer 400, or even external to network computer 400.

In some embodiments, data storage 410 may include tests 412 that may include one or more tests of an application. In some embodiments, a developer may upload tests 412 to network computer 400. In other embodiments, data storage 412 may include one or more test applications that may be uploaded by a developer and deployed to one or more target computers.

Applications 420 may include computer executable instructions which, when executed by network computer 400, transmit, receive, and/or otherwise process messages (e.g., SMS, Multimedia Messaging Service (MMS), Instant Message (IM), email, and/or other messages), audio, video, and enable telecommunication with another user of another mobile computer.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 420 may include application testing platform server 422.

In at least one of the various embodiments, application testing platform server 422 may be implemented as modules and/or components of the same application. Further, in at least one of the various embodiments, application testing platform server 422 may be implemented as operating system extensions, modules, plugins, or the like. Application testing platform server 422 may be configured to enable developers to upload test applications and/or tests for deployment on one or more target computers. In some embodiments, application testing platform server 422 may be employed by application testing platform server computer 112 of FIG. 1. In any event, application testing platform server 422 may be configured to employ various embodiments, combinations of embodiments, processes, or parts of processes, as described herein.

Furthermore, in at least one of the various embodiments, application testing platform server 422 may be operative in a cloud-based computing environment. In at least one of the various embodiments, these applications, and others, that comprise the mobile development platform may be executing within virtual machines and/or virtual servers that may be managed in a cloud-based based computing environment. In at least one of the various embodiments, in this context the applications may flow from one physical network computer within the cloud-based environment to another depending on performance and scaling considerations automatically managed by the cloud computing environment. Likewise, in at least one of the various embodiments, virtual machines and/or virtual servers dedicated to running application testing platform server 422 may be provisioned and de-commissioned automatically.

Also, in at least one of the various embodiments, tests 412, or the like, may located in virtual servers running in a cloud-based computing environment rather than being tied to one or more specific physical blade server computers or network computers.

General Operation

The operation of certain aspects of the invention will now be described with respect to FIGS. 5-7. In at least one of various embodiments, processes 500, 600, and 700 described in conjunction with FIGS. 5-7, respectively, may be implemented by and/or executed on a single network device, such as client device 300 of FIG. 3 and/or network device 400 of FIG. 4. In other embodiments, these processes or portions of these processes may be implemented by and/or executed on a plurality of network devices, such as client device 300 of FIG. 3 and/or network device 400 of FIG. 4. However, embodiments are not so limited and various combinations of network devices, or the like, may be utilized. Additionally, various embodiments described herein can be implemented in a system such as the system 800 of FIG. 8.

Figure 5:
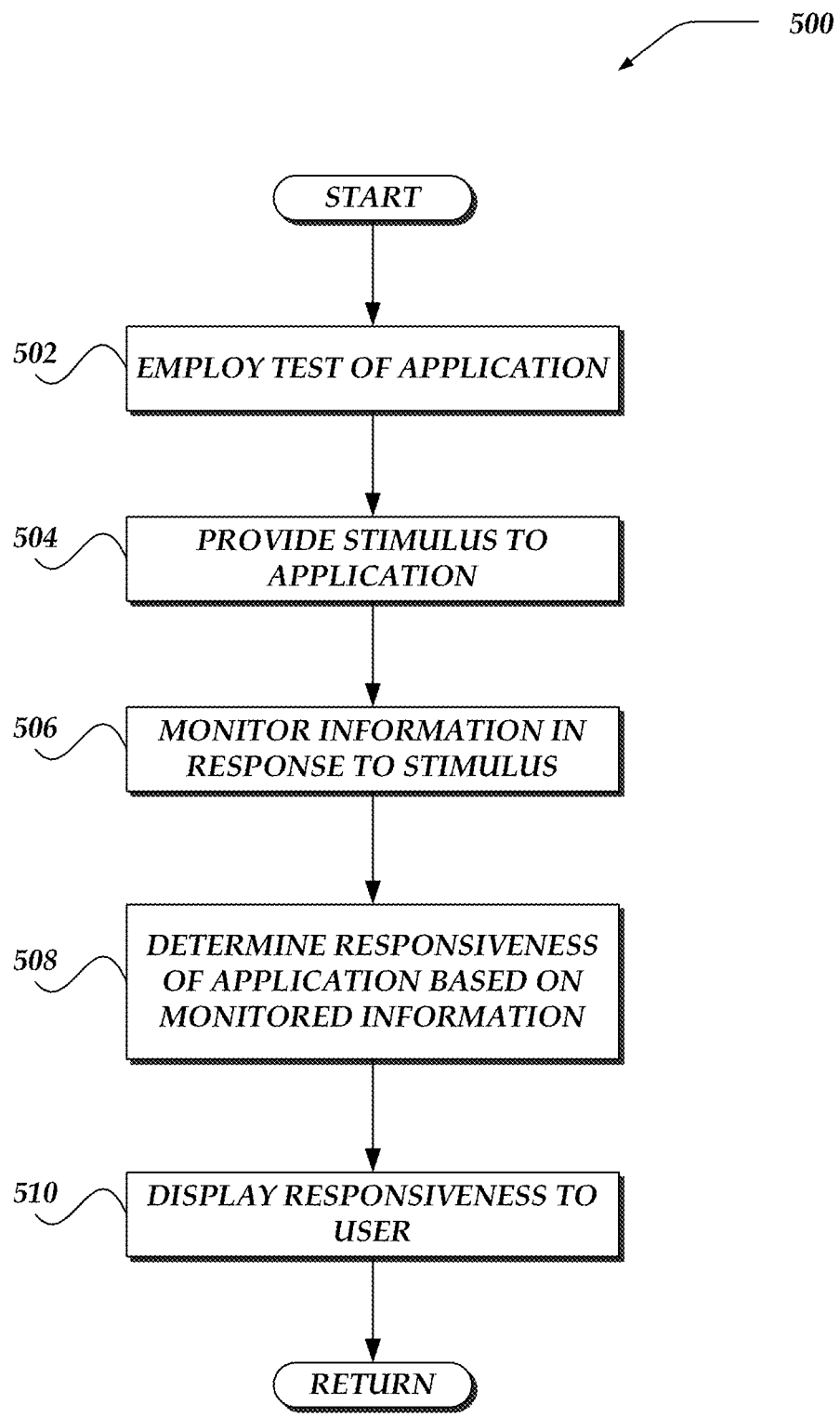
FIG. 5 illustrates a logical flow diagram generally showing one embodiment of an overview process for determining a responsiveness of an application during a test.

FIG. 5 illustrates a logical flow diagram generally showing one embodiment of an overview process for determining a responsiveness of an application during a test. Process 500 may begin, after a start block, at block 502, where a test may be employed for an application—also referred to as a test application. In some embodiments, a test may include one or more test scripts. A test may be may include one or more test steps. Each test step may include instructions for an action to be performed by the application. Non-limiting, non-exhaustive examples of test steps may include, but are not limited to, clicking on a button, entering text into a text input field, navigating the GUI, or the like.

As described in more detail below, the application may be installed and/or executing on one or more target computers. In some embodiments, each target computer may include different combinations of features, such as, but not limited to, manufacturer, make, model, operating system, screen resolution, or the like. In at least one of various embodiments, the test may be executing on the one or more target computers. In some embodiments, a test agent, or client testing application may be executing on the one or more target computers and enabled to employ the test.

Process 500 may proceed to block 504, where at least one stimulus may be provided to the application. Various embodiments for providing stimuli to the application are described in more detail below in conjunction with FIGS. 6 and 7. Briefly, however, one or more stimulus may be provided to the application. In various embodiments, one or more stimulus may be provided to the application for each test step of the employed test. In some embodiments, a separate application from the test application—such as a test agent (e.g., client testing application 810 of FIG. 8)—may provide the stimuli to the test application.

In at least one of various embodiments, the stimulus may include one or more requests for the application to respond to the stimulus. The requests may include, but are not limited to, a status check request, a heartbeat request, a state request, a request to determine if the application can accept external inputs, or the like, or any combination thereof. An example request may be a request for the application to respond when it is in a state to accept external inputs through the GUI. In some embodiments, stimuli may be to a same process thread of the application that is enabled to render graphic for the GUI. In at least one of various embodiments, stimuli may bypass the GUI and may be provided directly to a main loop of the application.

Process 500 may continue at block 506, where information provided by the application in response to the at least one stimulus may be monitored. Various embodiments for monitoring replies to stimuli are described in more detail below in conjunction with FIGS. 6 and 7. Briefly, however, another computer or application (e.g., client testing application 810 of FIG. 8) may be enabled to receive replies from the application in response to the stimulus. In some embodiments, the application may be modified to enable the communication (e.g., provide stimuli and/or monitor information) between a test agent (e.g., client testing application) and the application.

In some embodiments, a reply from the application may be an instruction, flag, status report, or other indicator providing some acknowledgement regarding the received stimulus. In some embodiments, the reply may acknowledge that the application received the stimulus; that the application is in a particular state (e.g., in an idle state); that the application is in a state where it can respond to external stimulus (e.g., though the GUI); or the like; or any combination thereof. In various other embodiments, the reply from the application may include other information and/or metrics regarding the application and/or the computer executing the application. In some embodiments, the other information/metrics may include, but are not limited to, memory consumption, processor utilization, power consumption, network latency, or the like.

Process 500 may proceed next to block 508, where a responsiveness of the GUI for the application may be determined based on the monitored information. Various embodiments for determining responsiveness of the application are described in more detail below in conjunction with FIGS. 6 and 7. Briefly, however, in some embodiments, the responsiveness may be determined for each portion of the employed test. In some embodiments, the responsiveness may be determined based on a wait time between when a stimulus (e.g., status request) is provided to the application and when the application responds to the stimulus. In other embodiments, the responsiveness may be determined based on a response time calculated from when a first stimulus of a plurality of stimuli is provided to the application and when the application finally responds to one of the plurality of stimuli.

In some other embodiments, the responsiveness may be determined based on a combination of monitored information/metrics provided by the application in response to the one or more stimulus. For example, in at least one of various embodiments, the responsiveness may be a score that may be generated from a weighted combination of one or more metrics, such as, for example, a wait and/or response time, amount of memory consumed, a number of processor cycles, network latency, or the like.

In any event, process 500 may continue next at block 510, where the responsiveness may be displayed to a user (e.g., a developer). In some embodiments, a displayable report may be generated based on the responsiveness of the application during the test. In at least one of various embodiments, the displayable report may include a comparison of the responsiveness of the application for a plurality of different computers (e.g., target computers 806 of FIG. 8).

In other embodiments, the displayable report may include a responsiveness for one or more portion (e.g., one or more test step) of the at least one test that was employed to test the application.

In various other embodiments, the report may include a comparison of other metric information associated with the application and/or target computer. For example, the report may include a graphical representation of the responsiveness (e.g., a time it took the application to respond to the stimuli), memory utilization, processor utilization, power consumption, network latency, or the like. In some embodiments, these metrics may be compared by displaying visualizations (e.g., graphs) of each metric side by side, in separate windows, overlaid on one graph, or the like, in the report.

In some embodiments, the graphical representations of the responsiveness or other metrics may be for one or more portions (or each portion) of the test (e.g., each test step). Accordingly, for a given portion of the test, the report may illustrate the responsiveness of the application for the given portion, an amount of memory utilized for the given portion, an amount of power consumed during the given portion, or the like. The display of the responsiveness may enable a user or application developer to identify those portions of the application that may be executing slower than desired. Similarly, the comparative illustration of the other metrics, along with the responsiveness, may indicate why the application executed slower than desired.

For example, assume that a given portion of the test was waiting for a reply from a server, if the responsiveness for given portion was high (e.g., a time to respond to the stimulus was above a predetermined threshold) and there was a spike in network latency (e.g., a time for the server to respond that was above another predetermined threshold), then the high network latency may have resulted in the slowness of the application. In contrast, if the responsiveness for the given portion was high, but the network latency was normal (e.g., below a predetermined threshold), then the slowness of the application may have been the result of something other than the network latency, such as for example, an application loop that timed out rather than completing when the server responded.

In various other embodiments, the report may include these comparative illustrations for a plurality of different target computers, where the application is separately execution on each target computer. So, the user or application developer can compare metrics for one or more portions of the test across multiple devices executing the same application. Such an illustration may enable the user to identify if the application executes sufficiently on multiple devices and if not, which devices and why.

After block 510, process 500 may terminate and/or return to a calling process to perform other actions.

Figure 6:
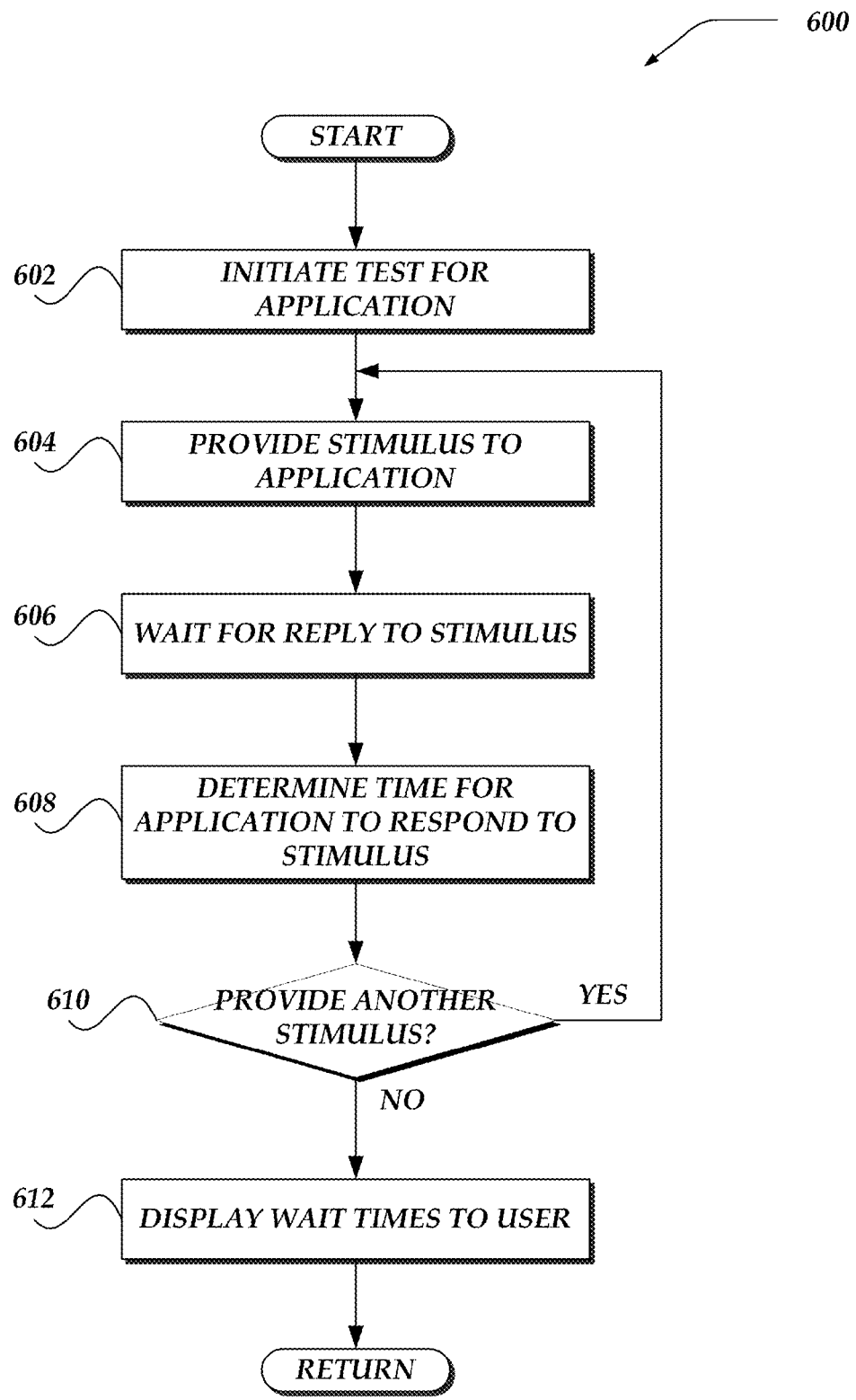
FIG. 6 illustrates a logical flow diagram generally showing one embodiment of a process for providing stimuli to an application during a test to determine a responsiveness of the application.

FIG. 6 illustrates a logical flow diagram generally showing one embodiment of a process for providing stimuli to an application during a test to determine a responsiveness of the application. In some embodiments, process 600 may be separately executed to test a responsiveness of an application executing on each of a plurality of different target computers. In other embodiments, process 600 may execute for one or more target computers, where a separate combination of blocks 604, 606, 608, and 610 may execute for each target computer.

Process 600 may begin, after a start block, at block 602, where a test for an application may be initiated. In at least one of various embodiments, initiating a test may include initiating the execution of a test for the application. In some embodiments, the application may be installed on one or more target computers and the test may be separately executed for each target computer.

As described in more detail below in conjunction with FIG. 8, initiating a test may include a developer uploading the application to an application testing platform (e.g., application testing platform server computer 804 of FIG. 8), and the application testing platform subsequently installing the application on to one or more target computers (e.g., mobile computers). In some embodiments, the developer may also upload the test (e.g., a test script) to the application testing platform for deployment to each target computer.

Process 600 may proceed to block 604, where a stimulus may be provided to the application. As described above, the stimulus may include a request for the application to respond to the stimulus. The request may include, but is not limited to, a status check request, a heartbeat request, a state request, a request to determine if the application can accept external inputs, or the like, or any combination thereof. An example request may be a request for the application to respond when it is in a state to accept external inputs through the GUI. Another example of a request may be a request that simulates an input through the GUI of the application.

In some embodiments, the stimulus may be provided to the application from a test agent or other application (e.g., client testing application 810 of FIG. 8) that is executing on the same computer that the application. For example, in at least one of various embodiments, a client testing application may provide a request or other stimulus to the application. In some embodiments, the client testing application may provide a request to the application instructing the application to notify the client testing application once the application processes the request, is in an idle state, is in a state to accept external inputs through the GUI, or the like. In at least one of various embodiments, the client testing application may initiate a timer or store a system time of when the stimulus is provided to the application.

Process 600 may continue at block 606, where the testing system may wait for a reply from the application in response to the stimulus. In some embodiments, the client testing application may wait idle—and not provide another stimulus to the application—until the application responds to the previous stimulus. In at least one of various embodiments, the client testing application may run a timer while it is waiting for the application to respond.

As described above, the reply may be an instruction, flag, status report, or other indicator providing some acknowledgement regarding the received stimulus. In some embodiments, the reply may acknowledge that the application received the stimulus from the client testing application. In other embodiments, the reply may indicate that the application is in a particular state (e.g., in an idle state). In yet other embodiments, the reply may indicate that the application is in a state where it can respond to external stimulus (e.g., through the graphical user interface).

Process 600 may proceed next to block 608, where a time may be determined for the application to respond to the stimulus. In various embodiments, this wait time may be utilized and/or an indicator of the responsiveness of the GUI for the application. In some embodiments, the wait time may correspond to the time between providing a given request to the application and receiving a reply to the given request from the application (i.e., the wait time may be the time the client testing application was waiting for the application to respond to a given stimulus/request). In at least one of various embodiments, a timer (e.g., start timer when stimulus is provided to the application and stop timer when a reply is received) and/or a difference in a system time (e.g., difference in system time from when stimulus is provided to the application and the system time when a reply is received) may be utilized to calculate the wait time. However, embodiments are not so limited, and other mechanisms may be employed to determine the wait time.

Process 600 may continue next at decision block 610, where a determination may be made whether another stimulus may be provided to the application. In some embodiments, a plurality of stimulus (or stimuli) may be provided to the application periodically, at uniform time intervals, at predetermined times, at a predetermined time after a response is received, at designated conditions during the test (e.g., within a predetermined time or a next instruction after a test step is executed), or the like. For example, in some embodiments, another stimulus may be provided to the application two milliseconds (or some other time period) after a reply is received from the application. In other embodiments, another stimulus may be provided to the application if another test step is performed on the application. If another stimulus may be provided to the application, then process 600 may loop to block 604 to provide another stimulus; otherwise, process 600 may flow to block 612.

At block 612, the wait times may be displayed to a user. In various embodiments, a displayable report may be generated to include a graph of the wait times for each portion (e.g., one or more test steps, each provided stimulus, or the like) of the test. In some embodiments, block 612 may employ embodiments of block 510 of FIG. 5 for displaying the wait times (i.e., the responsiveness) and the displayable report to a user. In some embodiments, the report may include a comparison of the responsiveness between a plurality of different target computers.

After block 612, process 600 may terminate and/or return to a calling process to perform other actions.

Figure 7:
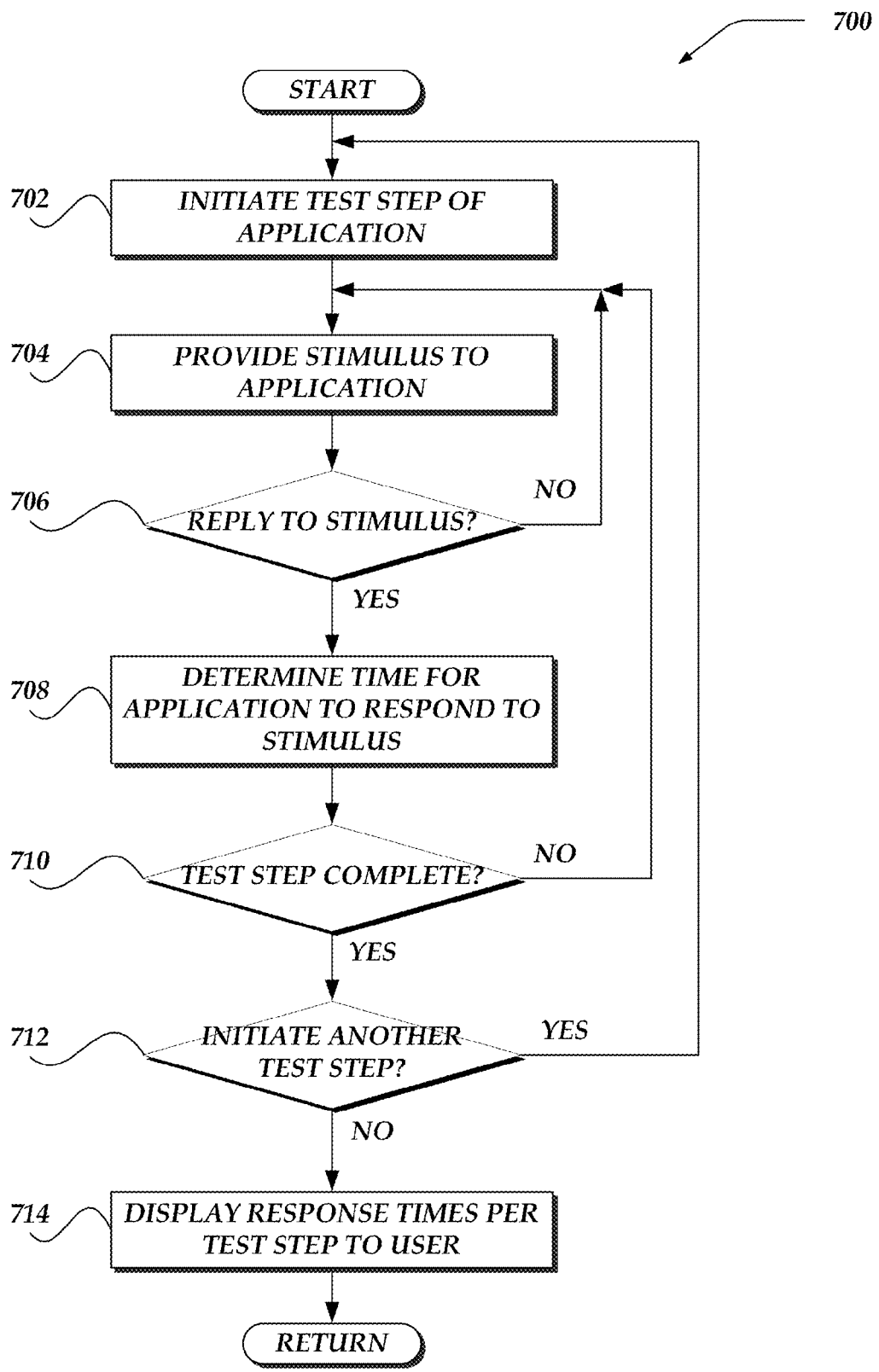
FIG. 7 illustrates a logical flow diagram generally showing an alternative embodiment of a process for providing stimuli to an application during a test to determine a responsiveness of the application.

FIG. 7 illustrates a logical flow diagram generally showing an alternative embodiment of a process for providing stimuli to an application during a test to determine a responsiveness of the application. In some embodiments, process 700 may be separately executed to test a responsiveness of an application executing on each of a plurality of different target computers. In other embodiments, process 700 may execute for one or more target computers, where a separate combination of blocks 702, 704, 706, 708, 710, and 712 may execute for each target computer.

Process 700 may begin, after a start block, at block 702, where a test step may be initiated to test an application. In at least one of various embodiments, block 702 may employ embodiments of block 602 of FIG. 6 to initiate a test of an application. However, block 70 may be employed for a given test step of a plurality of test steps included in a test.

Process 700 may proceed to block 704, where a stimulus may be provided to the application. In at least one of various embodiments, block 704 may employ embodiments of block 604 of FIG. 6 to provide a stimulus to the application.

Process 700 may continue at decision block 706, where a determination may be made whether the application provided a reply to the stimulus/request. In some embodiments, the application may be unable to receive and/or process the request because it is in a non-idle state and unable to process other instructions/commands. In at least one such embodiment, the application may not provide a reply because it never observed and/or processed the request. So, in some embodiments, a plurality of stimuli may be continually and/or periodically (e.g., at predetermined time intervals) provided to the application until the application responds to one of a plurality of stimulus. If the application provided a reply in response to the stimulus, then process 700 may flow to block 708; otherwise, process 700 may loop to block 704 to provide another stimulus to the application. In some embodiments, the application may be continually pinged with stimuli until the application responds that it is in a state to accept external inputs.

At block 708, a time may be determined for the application to respond to the stimulus. In various embodiments, this response time may be utilized and/or an indicator of the responsiveness of the GUI for the application for the test step initiated at block 702. In some embodiments, the response time may correspond to a time between when a first stimulus (e.g., a first request) of the plurality of stimuli is provided to the application and when a reply is received from the application. In some embodiments, the response time may be determined by employing a timer (e.g., start timer when a first stimulus is provided to the application and stop timer when a reply to the first stimulus or a subsequent stimulus is received), the system time (e.g., difference in system time from when a first stimulus is provided to the application and the system time when a reply to the first stimulus or a subsequent stimulus is received), or the like.

Process 700 may proceed next to decision block 710, where it may be determined whether the testing step is complete. In at least one of various embodiments, this determination may be based on an output from the application indicating that the test step is complete. In other embodiments, the test step may be determined to be complete based on a state of the application. In at least one of various embodiments, a comparison may be made between a state of the application and a predicted after-test-step state. If the application state and the predicted after-test-step state match, then the test step may be complete; otherwise, the test step may still be executing (or the test step may have failed, in which case process 700 may proceed (not shown) to decision block 712). If the test step is complete, then process 700 may flow to decision block 712; otherwise, process 700 may loop to block 704 to continue to provide periodic stimuli to the application.

At decision block 712, a determination may be made whether to initiate another test step. In at least one of various embodiments, another test step may be initiated if the test includes another unexecuted test step. In some embodiments, process 700 may continue until all test steps of the test are complete. If another testing step may be initiated, then process 700 may loop to block 702; otherwise, process 700 may flow to block 714.

At block 714, the response times may be displayed to the user. In at least one of various embodiments, block 714 may employ embodiments of block 612 of FIG. 6 to display the response times. In at least one of various embodiments, a displayable report may be generated to include the responsiveness (e.g., the response times) of each test step. In some embodiments, the report may include a comparison of the responsiveness between a plurality of different target computers.

After block 714, process 700 may terminate and/or return to a calling process to perform other actions.

It should be understood that the embodiments described in the various flowcharts may be executed in parallel, in series, or a combination thereof, unless the context clearly dictates otherwise. Accordingly, one or more blocks or combinations of blocks in the various flowcharts may be performed concurrently with other blocks or combinations of blocks. Additionally, one or more blocks or combinations of blocks may be performed in a sequence that varies from the sequence illustrated in the flowcharts.

Further, the embodiments described herein and shown in the various flowcharts may be implemented as entirely hardware embodiments (e.g., special-purpose hardware), entirely software embodiments (e.g., processor-readable instructions), or a combination thereof. The embodiments described herein and shown in the various flowcharts may be implemented by computer instructions (or processor-readable instructions). These computer instructions may be provided to one or more processors to produce a machine, such that execution of the instructions on the processor causes a series of operational steps to be performed to create a means for implementing the embodiments described herein and/or shown in the flowcharts. In some embodiments, these computer instructions may be stored on machine-readable storage media, such as processor-readable non-transitory storage media.

Illustrative System for a Mobile Application Testing Platform

In at least one of various embodiments, an application testing platform may be a system that enables application developers to upload their applications over a network to an application testing platform for testing the responsiveness of the application.

Figure 8:
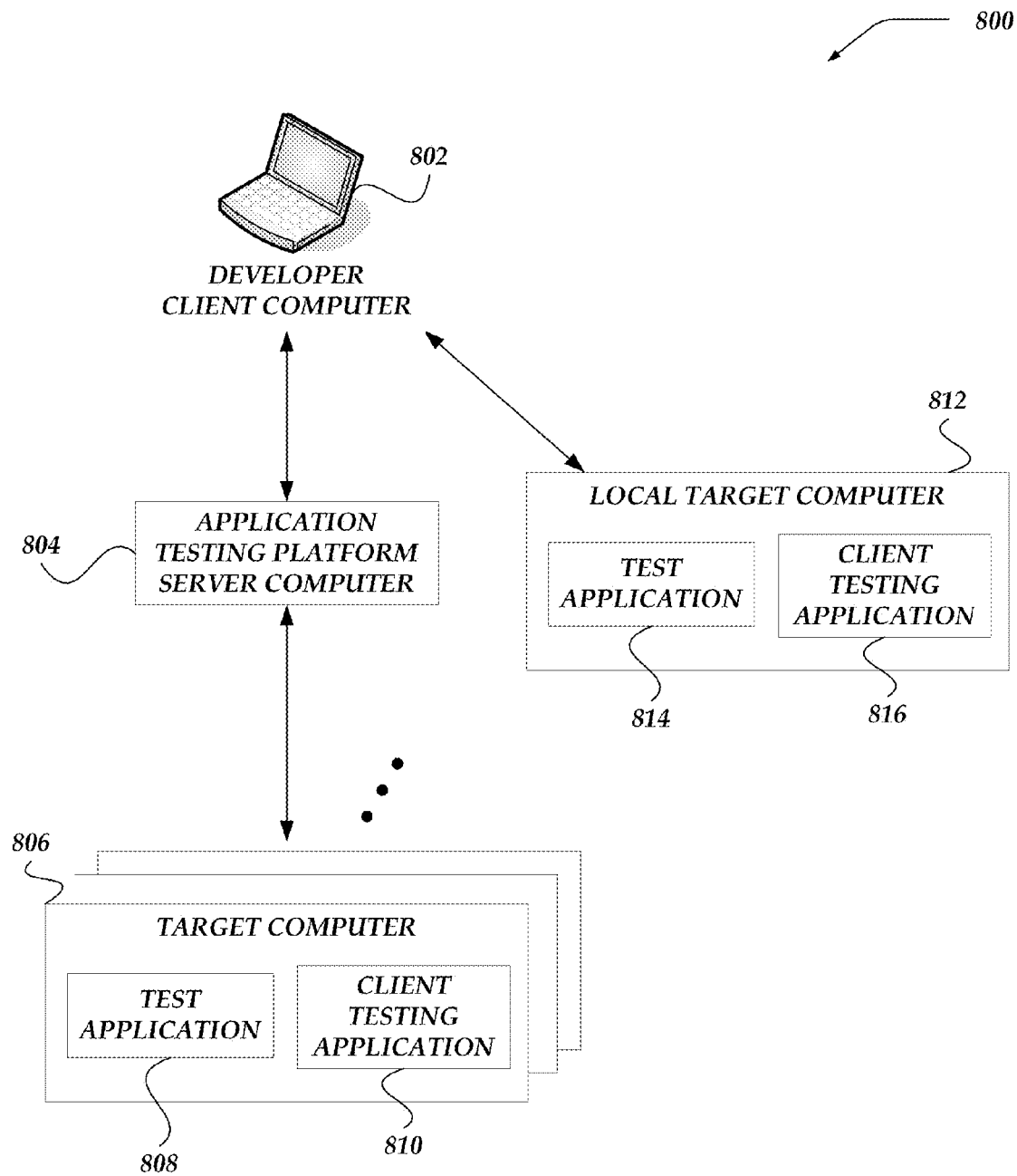
FIG. 8 illustrates a portion of a logical system diagram for an application testing platform in accordance with at least one of various embodiments.

FIG. 8 illustrates a portion of a logical architecture for application testing system 800. In some embodiments, application testing system 800 may include developer client computer 802, application testing platform server computer 804, and one or more target computers 806. In some embodiments, application testing system 800 may include local target computer 812.

Developer client computer 802 may be an embodiment of network or client computers 120, 122, 124, or 126 of FIG. 1. Application testing platform server computer 804 may be an embodiment of application testing platform server computer 112 of FIG. 1. Target computers 806 and/or local target computer 812 may be embodiments of one or more client computers 120, 122, 124, or 126 of FIG. 1 or other network computers.

In some embodiments, application developers may utilize developer client computer 802 to design and/or develop applications. These applications may include various types of applications, from mobile applications to "desktop" applications. In some embodiments, if an application is ready for testing (i.e., the "test application"), the application developers may utilize application testing platform server computer 804 for remote testing on target computers 806 or the application developers may locally test the application on local target computer 812.

For remote testing, the application developer may upload test application 808 to application testing platform server computer 804. In some embodiments, the application developer may also upload tests and/or test scripts, which may include test steps and/or information used for configuring and/or executing a test of test application 808. In at least one of various embodiments, application testing platform server computer 804 may select which target computers 806 to deploy test application 808 based on the test application, content of the one or more test scripts, or other criteria. In at least one of various embodiments, test application 808 may be an embodiment of test application 324 of FIG. 3.

In various embodiments, developer client computer 802, application testing platform server computer 804, and target computers 806 may communicate over various networks (e.g., network 102 of FIG. 1) or other communication mechanisms (e.g., Universal Serial Bus (USB) connections).

In some embodiments, target computers 806 may comprise one or more network computers (e.g., mobile computers 120, 122, 124, or 126 of FIG. 1) that may be utilized for the testing of test application 808. In some embodiments, target computers 806 may include a plurality of different target computers. In various embodiments, each of target computers 806 may include different combinations of features. For example, in some embodiments, target computers 806 may include various mobile devices from various manufacturers, makes, models, or the like. They may also include mobile devices with different versions of the operating systems that may be used with any particular mobile device. In at least one of the various embodiments, target computers 806 may be arranged to include numerous mobile devices to provide a reasonable coverage of various combinations of mobile device features that may be employed on mobile devices targeted by test application 808.

In at least one of various embodiments, each of target computers 806 may be pre-loaded with client testing application 810. In some embodiments, client testing application 810 may be an embodiment of client testing application 322 of FIG. 3. In various embodiments, client testing application 810 may be arranged to communicate with a testing control application operating on application testing platform server computer 804 (e.g., application testing platform server 422 of FIG. 4 and/or application testing platform server 282 of FIG. 2). This communication may enable each of target computers 806 to be controlled by application testing platform server computer 804. In at least one of the various embodiments, client testing application 810 may be arranged to use one or more well-known methods for remote controlling applications that may be operative on a target computer (e.g., a mobile device).

In some embodiments, application testing platform server computer 804 may be arranged to communicate test scripts or portions of test scripts to client testing application 810 on target computers 806. Client testing application 810 may execute the communicated test script on target computer 806, which may provide various inputs and/or instructions to test application 808 to test, simulate, and/or otherwise analyze test application 808. In at least one of various embodiments, test scripts may be arranged to include one or more test steps within a test script. In at least one of the various embodiments, a test step may be arranged to perform one or more actions on the computer device that may be under test. In at least one of the various embodiments, one or more test steps may be grouped and/or organized into a test.

In various embodiments, client testing application 810 may also be arranged to provide stimuli to test application 808 in accordance with embodiments described herein. Furthermore, client testing application 810 may receive responses to the stimuli from test application 808. In some embodiments, client testing application 810 may determine the responsiveness of application 808 and communicate those results to application testing platform server computer 804. Application testing platform server computer 804 may then enable the developer to view a displayable report that includes the responsiveness of the application for each target computer 806.

In some embodiments, test application 808 may be arranged to include a library and/or module that facilities remote control and/or interrogation by client testing application 810. In other embodiments, there may be built-in features of the operating system that may enable client testing application 810 to remote control other applications (e.g., test application 808), and/or to monitor applications that may be operative on target computer 806. Further, in at least one of various embodiments, test application 808 may be arranged for testing by compiling it in a "debug mode," which may enable client testing application 810 to have increased remote control and/or monitoring capability.

In some other embodiments, application developers may locally test the application on local target computer 812. In at least one such embodiment, developer client computer 802 may be arranged to include functionality of application testing platform server computer 804, such that developer client computer 802 may deploy test application 814 and test scripts directly to local target computer 812. In various embodiments, local target computer 812 may be an embodiment of target computer 806 and may enable the testing of test application 814 through client testing application 816. Similarly, client testing application 816 may provide stimuli to test application 814 to determine a responsiveness of test application 814 on local target computer 812.

Illustrative Use Cases

Figure 9:
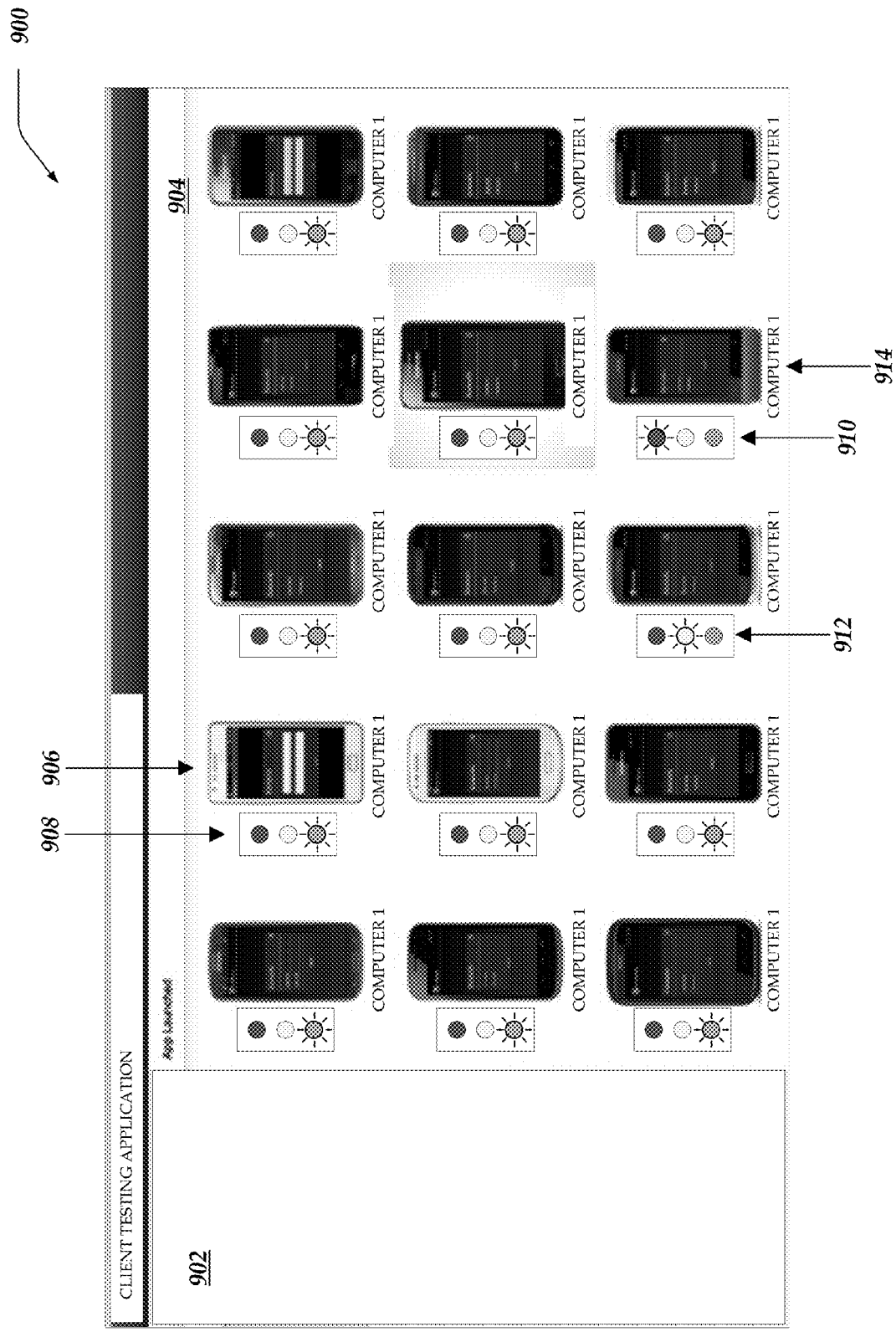
FIGS. 9-11 illustrate user interfaces that may be employed for displaying responsiveness results of an application during a test.
Figure 10:
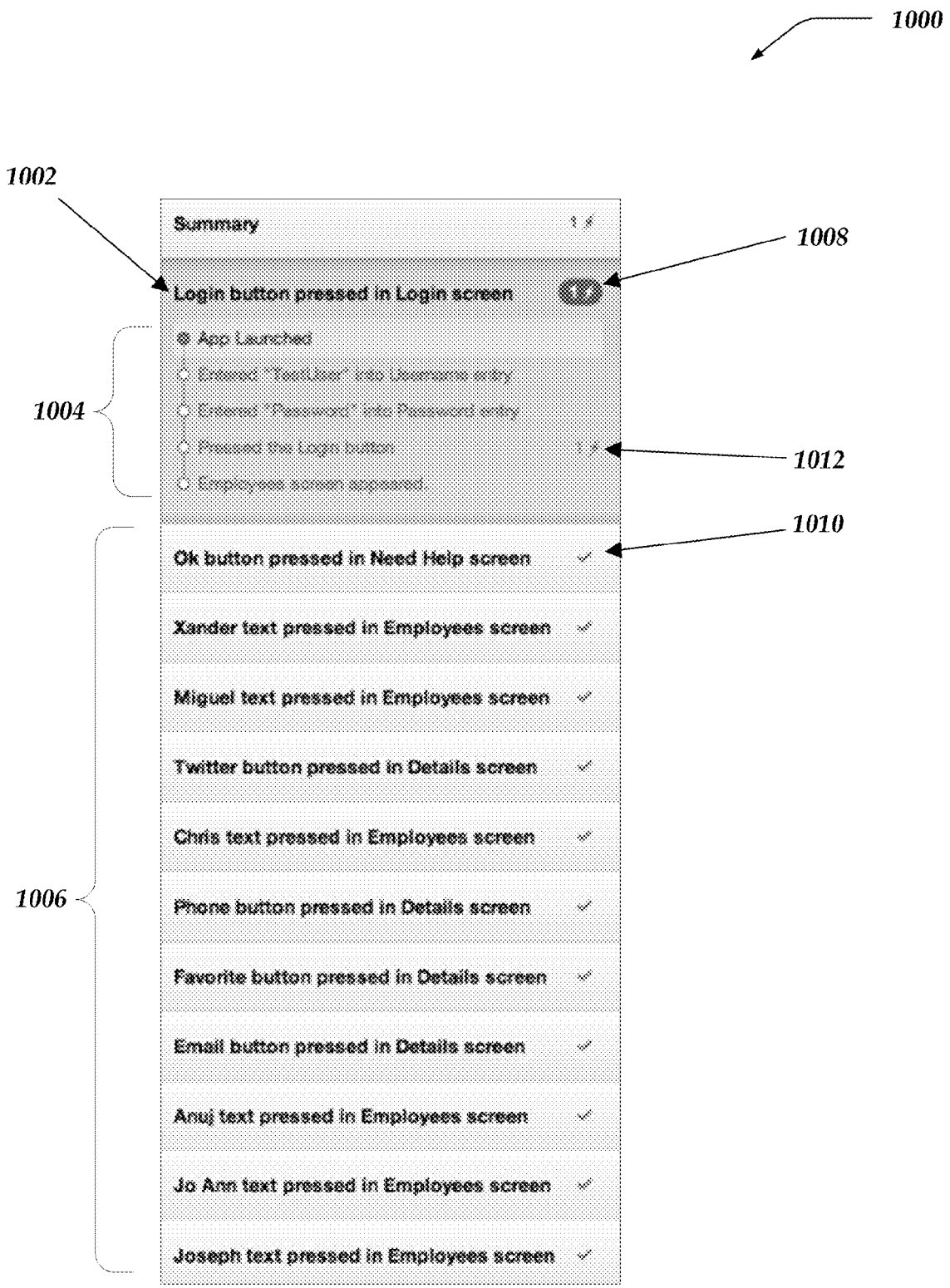
Figure 11:
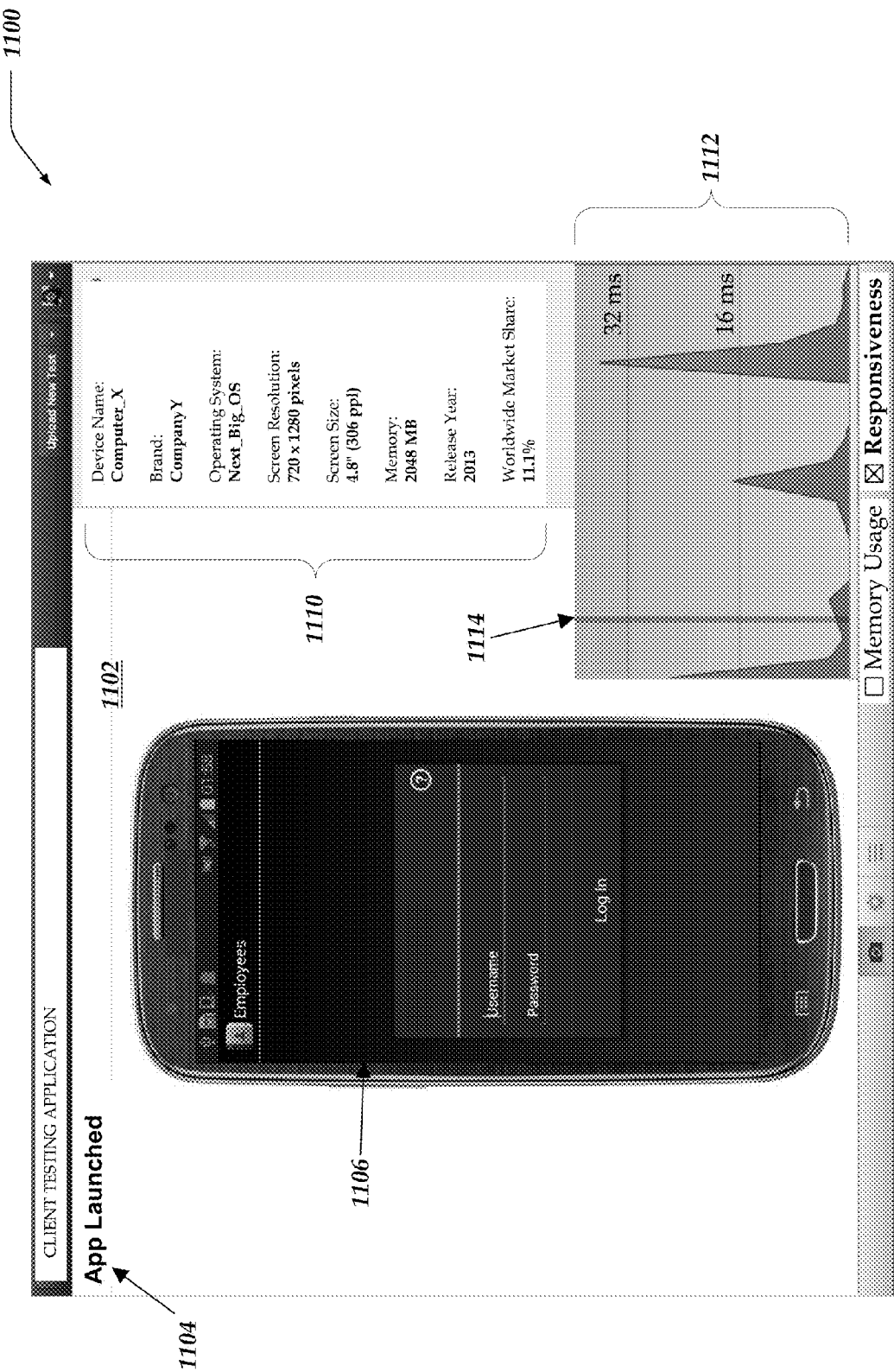

FIGS. 9-11 represent embodiments of user interface use cases for a mobile application testing platform in accordance with at least one of the various embodiments. In at least one of the various embodiments, user interfaces other than those represented in FIGS. 9-11 may be employed without departing from the spirit and/or scope of the claimed subject matter. Such user interfaces may have more or fewer user interface elements which may be arranged in various ways. In some embodiments, user interfaces may be generated using web pages, desktop applications, mobile applications, or the like. In at least one of the various embodiments, application testing platform server 422 of FIG. 4 may include modules, processes and/or APIs for enabling the generation of user interfaces, such as, those represented in FIGS. 9-11.

FIG. 9 illustrates user interface 900 for reviewing test run results for a mobile application testing platform, in accordance with at least one of the various embodiments. In at least one of various embodiments, interface 900 may include sidebar 902 and grid view 904. Sidebar 902 may be arranged to display tests, test steps, and/or corresponding test/step results. For convenience and clarity, illustrative contents for sidebar 902 are omitted in FIG. 9, but are illustrated and described in conjunction with FIG. 10. Briefly, however, sidebar 902 may list each test, each step, and a result of each step. Grid view 904 may be arranged to display an illustration of each computer that was a target computer for testing an application.

A user may be enabled to select a test and/or step in sidebar 902. In some embodiments, each computer illustration may be associated with a visual responsiveness indicator, such as indicators 908, 910, and 912. Each indicator may illustrate or show a representative value of the responsiveness of the application executing on a corresponding computer.

As illustrated, these indicators may be a symbolic stoplight, where green, amber, and red (colors not illustrated in the figure, but from top to bottom, red-amber-green) may indicate different levels of responsiveness. For example, if the responsiveness is below a first threshold value, then the green (or bottom) signal may be illuminated (as shown by indicator 908); if the responsiveness is above the first threshold value and below a second threshold value, then the amber (or middle) signal may be illuminated (as shown by indicator 912); and if the responsiveness is above the second threshold value, then the red (or top) signal may be illuminated (as shown by indicator 910).

As different tests and/or steps may be selected, the responsiveness indicators may change based on the responsiveness (as determined by employing embodiments described herein) for the selected test and/or step. Viewing the multiple computers together can enable users (i.e., application developers) to identify potential problems based on the responsiveness (as shown by the responsiveness indicators) of the different computers.

Although stoplight indicators are illustrated in FIG. 9, embodiments are not so limited and other indicators may be utilized to show a responsiveness of the application executing on a corresponding computer for a selected test and/or step. Other examples of indicators may include, but are not limited to, status bars, representative numbers, changing colored objects, text highlighting, or the like.

In other embodiments, each computer illustration in grid view 904 may include a screenshot that corresponds to the selected test and/or step. So, as different tests and/or steps may be selected, the screenshots of the computers may change to screenshots that correspond to the selected test and/or step. Viewing the multiple computers together can enable users (i.e., application developers) to identify potential problems with how the user-interface of the tested application may be rendered on different computers.

In some cases, user interface problems may be visible to the naked eye, even though the corresponding test has passed. As illustrated, for example, the screenshot of mobile computer 906 may show a white background for the username and password input fields, compared to a dark background. In this example, if the application is programmed to use a white font for username and password input fields, then a user of the computer may have difficulty reading what they may input into these fields. By viewing multiple (some or all) computers together, the probability may be improved that a developer may notice that a computer is behaving differently than most other devices in the test.

FIG. 10 illustrates sidebar 1000 for an application testing platform in accordance with at least one of the various embodiments. In some embodiments, sidebar 1000 may be an embodiment of sidebar 902 of FIG. 9. In at least one of various embodiments, sidebar 1000 may include a list of each test and/or test step that comprised a test run of an application. In at least one of the various embodiments, each test may be displayed to show the name and/or description of the test, the results of the test, name and/or descriptions of one or more test steps for each test, and so on. In some embodiments, sidebar 1000 may be a scrollable user-interface to enable the display of tests/test steps that may be hidden from view.

In this example, test 1002 is shown with a description of "Login button pressed in Login screen." Here, as shown, test 1002 has been expanded to show test steps 1004 that may comprise test 1002. Further, within test steps 1004, the individual test step that is currently active (e.g., the test step selected by a developer) is indicated (e.g., "App Launched"). The indicated test step may correspond with the computer screenshots that may be displayed in an accompanying grid view, such as, grid view 904 in FIG. 9. Sidebar 1000 further, includes names and/or descriptions for unexpanded tests 1006. In at least one of the various embodiments, a developer may expand tests 1006 by clicking with a mouse, arrow keys, or otherwise selecting the test, to expose the test steps that may comprise the test.

In at least one of the various embodiments, emblems, such as, emblem 1008, emblem 1010, or the like, may be included with the tests that are listed in sidebar 1000. In at least one of the various embodiments, emblems may indicate critical information to a developer relating to a test. For example, in some embodiments, emblem 1008 may indicate that the corresponding test includes a test step that resulted in a responsiveness of an application executing on at least one target computer to be above a predetermined threshold value. In other embodiments, emblem 1008 may indicate that the corresponding test includes a test step that failed. A test step may fail if the application failed to properly execute the test step on at least one target computer.

In some embodiments, emblem 1010 may indicate that the responsiveness of the target computers to be of satisfactory values (e.g., below a predetermined threshold value) for the corresponding test and each included test step. In other embodiments, emblem 1010 may indicate that the corresponding test passed (e.g., the application properly executed each test step on each of the at least one target computer).

Furthermore, in at least one of the various embodiments, test steps may be marked with emblems to convey additional information as well. For example, emblem 1012 may indicate that the test step named "Pressed the Login button" has recorded at least one fail on at least one of the computers employed for the test. In another example, emblem 1012 may indicate that a responsiveness of at least one of the computing devices is above a one or more predetermined thresholds. In at least one of the various embodiments, emblems may be color coded, such that the color corresponds to one or more of importance, priority, type of information, degree of failure (e.g., how unresponsive was the target computer during the test step), or the like. Likewise, the particular symbol used for the emblems may correspond to one or more of importance, priority, type of information, degree of failure, or the like. It should be understood that the information presented in sidebar 1000 is illustrative of an embodiment and more, less, or different information may be presented in sidebar 1000.

FIG. 11 illustrates user interface 1100 for displaying target computer details on an application testing platform in accordance with at least one of the various embodiments. In at least one of the various embodiments, while viewing or browsing a grid view, such as, grid view 904 of FIG. 9, a user may select to view the detail information for a particular target computer. If a detail view is displayed, detail pane 1102 may be displayed in place of the grid view. In some embodiments, detail pane 1102 may be arranged to be a popup window, rather than replacing the grid view. In at least one of various embodiments, the current test step that corresponds to the detail view may be displayed in a label, such as, label 1104 (e.g., the test step selected in sidebar 902 of FIG. 9).

In at least one of various embodiments, metric graph 1112 may be displayed to show the responsiveness of the tested application on the selected device. The graph may illustrate the responsiveness of the application during the test of the application, and may, in some embodiments, be separated by test steps. In some embodiments, the x-axis of metric graph 1112 may represent the test steps. In other embodiments, the x-axis of metric graph 1112 may represent the stimuli that are provided to the application. For example, vertical bar 1114 may represent a particular test step (e.g., the selected test step from sidebar 902 of FIG. 9) or stimuli that was provided to the application. In at least one of various embodiments, the y-axis may represent to the responsiveness of a corresponding test step and/or stimuli.

As illustrated, metric graph 1112 may include one or more predetermined responsiveness thresholds, such as, for example, 16 milliseconds and 32 milliseconds. In some embodiments, the range between thresholds may correspond to the different indicator signals described in FIG. 9, such as indicator 908. So as shown, the indicator signal during the test step indicated by vertical bar 1114 may be a "green" signal because the responsiveness is below the 16 millisecond threshold. In some embodiments, the responsiveness threshold may indicate a number of frames that may be dropped or are not produced while the application is waiting. For example, if the responsiveness is above the 16 millisecond threshold, then one frame may have been dropped. And if the responsiveness is above the 32 millisecond threshold, then two frames may have been dropped.

Metric graph 1112 should not be construed as being exhaustive or limiting; but, rather, other types of graphs (e.g., bar charts, line graphs, lists of responsive data, or the like), other threshold values, numbers of thresholds, or the like, may be employed. In some cases, multiple metrics may be displayed as well as metrics from other mobile devices, test runs, applications, averages, or the like, for comparison purposes. Furthermore, in at least one of the various embodiments, if relevant significant deviations from normal have occurred they may be emphasized with additional user-interface techniques to bring a user's attention to the deviations, e.g., providing an alert (e.g., flashing text in user interface 1100, sending an email/text message alert, or the like) if the responsiveness is at least one of the threshold values.

User interface 1100 may include additional information regarding the selected target computer for the selected test step. For example, in some embodiments, an expanded (zoomed) view of the target computer screenshots, such as, screenshot 1106 may be displayed. Screenshot 1106 may correspond with the test step that may be selected in a sidebar, such as sidebar 902 of FIG. 9. In other embodiments, a side pane may include information list 1110, which may display various characteristics of the target computer. In at least one of the various embodiments, information list 1110 may include device information, such as, the make and model, operating system with version, screen size, screen resolutions, memory capacity, market share, or the like. However, embodiments are not so limited and other information related to the target computer, test, test step, tested application, or the like, may be displayed in user interface 1100.

The above specification, examples, and data provide a complete description of the manufacture and use of the composition of the invention. Since many embodiments can be made without departing from the spirit and scope of the invention, the invention resides in the claims hereinafter appended.

What is claimed is:

1. A method for improving testing of mobile applications for mobile computers over a network, wherein the method employs a network computer to perform actions, comprising:
providing a plurality of stimuli to a mobile application based on execution of a test script, wherein each stimulus requests a response from the mobile application that is executing on a mobile computer;
determining responsiveness of at least the mobile application based on at least monitored information for the mobile computer, wherein the responsiveness is based on at least an amount of time for the mobile application to return to a state ready to accept another stimulus;
displaying of at least a representation of the responsiveness of the mobile application executing on the mobile computer;
concurrently displaying separate screen shots of the mobile application executing on both the mobile computer and a plurality of other different mobile computers; and
displaying a relationship between each displayed screen shot and execution of at least a portion of equivalent test scripts on each mobile computer.

2. The method of claim 1, wherein providing the plurality of stimuli, further comprises at least one of:
providing at least one stimulus to a process thread of the mobile application that also performs graphics rendering for a graphical user interface; or
providing a heartbeat to execute with a main logical loop of the mobile application.

3. The method of claim 1, wherein displaying the at least representation of the responsiveness, further comprises at least one of memory consumption, processor utilization, power consumption, or network latency, for at least one executed portion of a test script.

4. The method of claim 1, wherein displaying the at least representation of the responsiveness, further comprises a comparison of the responsiveness of the mobile application and equivalent test scripts separately executing on each of a plurality of different mobile computers for at least one portion of their equivalent test scripts.

5. The method of claim 1, wherein displaying the representation further comprises at least one of:
employing a side bar to display at least one test step for at least one portion of a test script; or
selecting at least one test step in the side bar, wherein additional information regarding the execution of the selected test step is displayed.

6. The method of claim 1, wherein displaying at least the representation, further comprises at least one of:
displaying at least one screen shot of the mobile application executing on the mobile computer;
displaying a relationship between each displayed screen shot and execution of at least a portion of a test script on the mobile computer; or
displaying at least one of status bars, changing colored objects, text highlighting, representative numbers, or indicators.

7. The method of claim 1, wherein displaying at least the representation, further comprises displaying at least one emblem that corresponds to at least one of importance, priority, type of information, or degree of failure.

8. A network computer for improving the testing of mobile applications over a network, comprising:
a memory for storing at least instructions; and
a processor that executes the instructions to enable actions, including:
providing a plurality of stimuli to a mobile application based on execution of a test script, wherein each stimulus requests a response from the mobile application that is executing on a mobile computer;
determining responsiveness of at least the mobile application based on at least monitored information for the mobile computer, wherein the responsiveness is based on at least an amount of time for the mobile application to return to a state ready to accept another stimulus;

displaying of at least a representation of the responsiveness of the mobile application executing on the mobile computers;

concurrently displaying separate screen shots of the mobile application executing on both the mobile computer and a plurality of other different mobile computers; and displaying a relationship between each displayed screen shot and execution of at least a portion of equivalent test scripts on each mobile computer.

9. The network computer of claim 8, wherein providing the plurality of stimuli, further comprises at least one of:
providing at least one stimulus to a process thread of the mobile application that also performs graphics rendering for a graphical user interface; or
providing a heartbeat to execute with a main logical loop of the mobile application.

10. The network computer of claim 8, wherein displaying the at least representation of the responsiveness, further comprises at least one of memory consumption, processor utilization, power consumption, or network latency, for at least one executed portion of a test script.

11. The network computer of claim 8, wherein displaying the at least representation of the responsiveness, further comprises a comparison of the responsiveness of the mobile application and equivalent test scripts separately executing on each of a plurality of different mobile computers for at least one portion of their equivalent test scripts.

12. The network computer of claim 8, wherein displaying the representation further comprises at least one of:
employing a side bar to display at least one test step for at least one portion of a test script; or
selecting at least one test step in the side bar, wherein additional information regarding the execution of the selected test step is displayed.

13. The network computer of claim 8, wherein displaying at least the representation, further comprises at least one of:
displaying at least one screen shot of the mobile application executing on the mobile computer;
displaying a relationship between each displayed screen shot and execution of at least a portion of a test script on the mobile computer; or
displaying at least one of status bars, changing colored objects, text highlighting, representative numbers, or indicators.

14. The network computer of claim 8, wherein displaying at least the representation, further comprises displaying at least one emblem that corresponds to at least one of importance, priority, type of information, or degree of failure.

15. A system for improving the testing of mobile applications over a network, comprising:
a mobile computer that is configured to perform actions, including:
providing a plurality of stimuli to a mobile application based on execution of a test script, wherein each stimulus requests a response from the mobile application that is executing on the mobile computer; and
a network computer that is configured to perform actions, including:
determining responsiveness of at least the mobile application based on at least monitored information for the mobile computer, wherein the responsiveness is based on at least an amount of time for the mobile application to return to a state ready to accept another stimulus; and
displaying of at least a representation of the responsiveness of the mobile application executing on the mobile computer, wherein the representation includes one or more comparisons of the responsiveness of the mobile application and equivalent test scripts separately executing on each of a plurality of different mobile computers for at least one portion of their equivalent test scripts.

16. The system of claim 15, wherein providing the plurality of stimuli, further comprises at least one of:
providing at least one stimulus to a process thread of the mobile application that also performs graphics rendering for a graphical user interface; or
providing a heartbeat to execute with a main logical loop of the mobile application.

17. The system of claim 15, further comprising:
concurrently displaying separate screen shots of the mobile application executing on both the mobile computer and a plurality of other different mobile computers; and
displaying a relationship between each displayed screen shot and execution of at least a portion of equivalent test scripts on each mobile computer.

18. The system of claim 15, wherein displaying the representation further comprises at least one of:
employing a side bar to display at least one test step for at least one portion of a test script; or
selecting at least one test step in the side bar, wherein additional information regarding the execution of the selected test step is displayed.

19. The system of claim 15, wherein displaying at least the representation, further comprises at least one of:
displaying at least one screen shot of the mobile application executing on the mobile computer;
displaying a relationship between each displayed screen shot and execution of at least a portion of a test script on the mobile computer; or
displaying at least one of status bars, changing colored objects, text highlighting, representative numbers, or indicators.

20. The system of claim 15, wherein displaying at least the representation, further comprises displaying at least one emblem that corresponds to at least one of importance, priority, type of information, or degree of failure.

21. A processor readable non-transitory storage media that includes instructions for improving the testing of mobile applications over a network, wherein execution of the instructions by a network computer enables actions, comprising:
providing a plurality of stimuli to a mobile application based on execution of a test script, wherein each stimulus requests a response from the mobile application that is executing on a mobile computer;
determining responsiveness of at least the mobile application based on at least monitored information for the mobile computer, wherein the responsiveness is based on at least an amount of time for the mobile application to return to a state ready to accept another stimulus; and
displaying of at least a representation of the responsiveness of the mobile application executing on the mobile computer, wherein the representation includes one or more comparisons of the responsiveness of the mobile application and equivalent test scripts separately executing on each of a plurality of different mobile computers for at least one portion of their equivalent test scripts.

22. The media of claim 21, wherein displaying at least the representation, further comprises displaying at least one emblem that corresponds to at least one of importance, priority, type of information, or degree of failure.

23. The media of claim 21, further comprising:
concurrently displaying separate screen shots of the mobile application executing on both the mobile computer and a plurality of other different mobile computers; and
displaying a relationship between each displayed screen shot and execution of at least a portion of equivalent test scripts on each mobile computer.

24. The media of claim 21, wherein displaying the at least representation of the responsiveness, further comprises at least one of memory consumption, processor utilization, power consumption, or network latency, for at least one executed portion of a test script.

25. The media of claim 21, wherein displaying the representation further comprises at least one of:
employing a side bar to display at least one test step for at least one portion of a test script; or
selecting at least one test step in the side bar, wherein additional information regarding the execution of the selected test step is displayed.

26. The media of claim 21, wherein displaying at least the representation, further comprises at least one of:
displaying at least one screen shot of the mobile application executing on the mobile computer;
displaying a relationship between each displayed screen shot and execution of at least a portion of a test script on the mobile computer; or
displaying at least one of status bars, changing colored objects, text highlighting, representative numbers, or indicators.

* * * * *

UNITED STATES PATENT AND TRADEMARK OFFICE
CERTIFICATE OF CORRECTION

PATENT NO. : 9,053,242 B2  
APPLICATION NO. : 14/511117  
DATED : June 9, 2015  
INVENTOR(S) : Smith et al.

Page 1 of 1

It is certified that error appears in the above-identified patent and that said Letters Patent is hereby corrected as shown below:

On the title page

On Page 2, item 56 under "OTHER PUBLICATIONS", in Column 2, Line 14, delete "Implemention" and insert -- Implementation --, therefor.

In the specification

In Column 1, Line 11, delete "2013," and insert -- 2013, now Pat. No. 8,881,111, --, therefor.

In Column 5, Line 48, delete "(MANs)" and insert -- (MANs), --, therefor.

In Column 7, Line 12, delete "Backplane 208" and insert -- Backplane 202 --, therefor.

In Column 13, Lines 53-54, delete "storage 412" and insert -- storage 410 --, therefor.

In the claims

In Column 27, Line 6, in Claim 8, delete "computers;" and insert -- computer; --, therefor.

Signed and Sealed this  
Third Day of May, 2016

Michelle K. Lee  
*Director of the United States Patent and Trademark Office*